US012341795B2

(12) United States Patent
Fellows et al.

(10) Patent No.: US 12,341,795 B2
(45) Date of Patent: Jun. 24, 2025

(54) INTERACTIVE ARTIFICIAL INTELLIGENCE-BASED RESPONSE LOOP TO A CYBERATTACK

(71) Applicant: Darktrace Holdings Limited, Cambridge (GB)

(72) Inventors: Simon Fellows, Cambridge (GB); Jack Stockdale, Cambridge (GB); Matt Dunn, Ely (GB)

(73) Assignee: Darktrace Holdings Limited, Cambridge (GB)

( * ) Notice: Subject to any disclaimer, the term of this patent is extended or adjusted under 35 U.S.C. 154(b) by 285 days.

(21) Appl. No.: 17/991,250

(22) Filed: Nov. 21, 2022

(65) Prior Publication Data

US 2023/0164158 A1    May 25, 2023

Related U.S. Application Data

(60) Provisional application No. 63/281,978, filed on Nov. 22, 2021.

(51) Int. Cl.
*H04L 9/40* (2022.01)
*H04L 41/0654* (2022.01)
(Continued)

(52) U.S. Cl.
CPC .......... *H04L 63/1425* (2013.01); *H04L 41/16* (2013.01); *H04L 63/1408* (2013.01);
(Continued)

(58) Field of Classification Search
CPC ............. H04L 63/1425; H04L 63/1408; H04L 63/1416; H04L 63/1441; H04L 63/20;
(Continued)

(56) References Cited

U.S. PATENT DOCUMENTS 10,148,664 B2    12/2018 Bercovich et al.
10,268,821 B2    4/2019 Stockdale
(Continued)

OTHER PUBLICATIONS

Artificial intelligence, cyber-threats and Industry 4.0: challenges and opportunities, by Gama et al., Published Feb. 2021 (Year: 2021).*

(Continued)

*Primary Examiner* — Vu V Tran
(74) *Attorney, Agent, or Firm* — Rutan and Tucker, LLP

(57) ABSTRACT

An intelligent orchestration module can facilitate an AI augmented and adaptive interactive response loop between multiple AI-based engines. A cyber threat detection uses AI to detect a cyber threat. An autonomous response engine uses AI to mitigate the detected cyber threat. A cybersecurity restoration engine uses AI to remediate nodes in the system to a trusted operational state. The prediction engine uses AI to conduct simulations of cyberattacks to assist in determining how a simulated cyberattack might occur in the system, and how to use the simulated cyberattack information to preempt possible escalations of an ongoing actual cyberattack. The multiple AI-based engines bilaterally exchange behavioral metrics between the AI-based engines to work together to provide an overall cyber threat response during the ongoing cyberattack in light of continuing attack activities and simulations of the cyberattack to predict what might occur in the nodes based on the mitigation actions taken and/or the restoration actions taken.

20 Claims, 17 Drawing Sheets

(51) Int. Cl.
*H04L 41/147* (2022.01)
*H04L 41/16* (2022.01)
*H04W 12/122* (2021.01)

(52) U.S. Cl.
CPC ...... *H04L 63/1416* (2013.01); *H04L 63/1441* (2013.01); *H04L 63/20* (2013.01); *H04W 12/122* (2021.01)

(58) Field of Classification Search
CPC . H04L 63/1433; H04L 41/16; H04L 41/0654; H04L 41/147; H04W 12/122
See application file for complete search history.

(56) References Cited

U.S. PATENT DOCUMENTS

| | | |
|---|---|---|
| 10,419,466 B2 | 9/2019 | Ferguson |
| 10,701,093 B2 | 6/2020 | Dean |
| 2008/0133540 A1 | 6/2008 | Hubbard et al. |
| 2009/0271842 A1 | 10/2009 | Baumhof |
| 2019/0026461 A1* | 1/2019 | Cidon ...................... G06N 5/04 |
| 2019/0260786 A1* | 8/2019 | Dunn .................. G06F 16/2455 |
| 2020/0244673 A1 | 7/2020 | Stockdale |
| 2021/0194924 A1 | 6/2021 | Heinemeyer et al. |
| 2021/0273958 A1 | 9/2021 | McLean |
| 2021/0314349 A1* | 10/2021 | Liu ........................ G06N 20/00 |
| 2022/0309387 A1* | 9/2022 | Rodriguez ............ H04L 9/3213 |

OTHER PUBLICATIONS

United States Patent and Trademark Office, The Internationl Search Report and the Written Opinion of the International Searching Authority, Mar. 10, 2023, 14 pages.

The Extended European Search Report, European Patent Office, Oct. 9, 2024, 15pp.

* cited by examiner

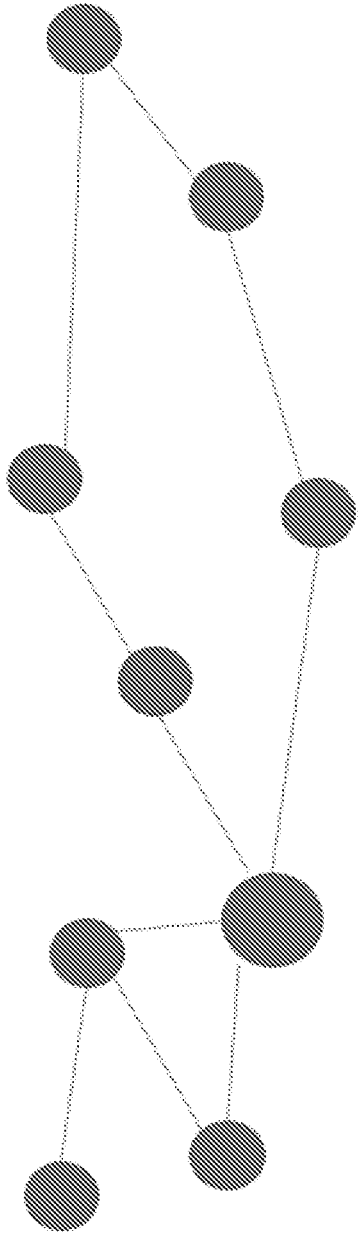

Partial graph of nodes making up the system under analysis

Cyber attack response scenarios from database and/or direct communication in real time with the Prevent component of Potential Response actions for each node (User Account and/or Device) and the corresponding nodes adjacent to a compromised node in the graph of the system being protected

AI tracking mechanism
DB/AI model (Trusted) Operational States of each node (User account and/or Device) in the graph of the system being protected

100

Actual 3rd party Data recovery system

Fig. 3

FIG. 8 Network

INTERACTIVE ARTIFICIAL INTELLIGENCE-BASED RESPONSE LOOP TO A CYBERATTACK

RELATED APPLICATION

This application claims priority under 35 USC 119 to U.S. provisional patent application No. 63/281,978, titled "CYBER SECURITY TOOLS TO PROTECT A SYSTEM" filed Nov. 22, 2021, which the disclosures of such are incorporated herein by reference in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Cyber security and in an embodiment use of Artificial Intelligence in cyber security.

BACKGROUND

Typical stages of IR (Incident Response) are a linear progression through: prepare, identify, contain, remediate, recover, and aftermath. There is no interaction and adaption between these stages.

SUMMARY

Methods, systems, and apparatus are disclosed for an Artificial Intelligence-based cyber security system. The Artificial Intelligence-based cyber security system can include multiple Artificial Intelligence-based engines working in tandem to provide an overall cyber threat response.

In an embodiment, the cyber threat detection engine configured with software code, electronic hardware as well as to use Artificial Intelligence algorithms can include a set of modules cooperating with one or more Artificial Intelligence models to detect a cyber threat incident. The detection engine detects anomalous behavior of one or more nodes in a graph of a system being protected. The cyber threat detection engine also has an anomaly alert system in a formatting module configured to report out anomalous incidents and events as well as the cyber threat detected to at least a display screen, a message to a cyber security professional, a printed report, and any combination of these.

An intelligent orchestration module is configured to facilitate an Artificial Intelligence augmented and adaptive interactive response loop between multiple Artificial Intelligence-based engines including but not limited to the cyber threat detection engine, an autonomous response engine, and cyber-security restoration engine.

The cyber threat detection engine uses Artificial Intelligence and other algorithms trained to perform a first machine-learned task of detecting the cyber threat. The autonomous response engine uses Artificial Intelligence algorithms trained to perform a second configured or machine-learned task of taking one or more mitigation actions to mitigate the cyber threat. The cyber-security restoration engine uses Artificial Intelligence algorithms trained to perform a third configured or machine-learned task of taking one or more remediation actions to remediate one or more nodes of the system being protected back to a trusted operational state.

The multiple Artificial Intelligence-based engines have communication hooks in between them to exchange behavioral metrics between the multiple Artificial Intelligence-based engines to work together to provide an overall cyber threat response.

These and other features of the design provided herein can be better understood with reference to the drawings, description, and claims, all of which form the disclosure of this patent application.

DRAWINGS

The drawings refer to some embodiments of the design provided herein in which.

FIG. 3 illustrates a diagram of an embodiment of the cyber security restoration engine configured to take one or more autonomous remediation actions based on Artificial Intelligence assistance to remediate one or more nodes in the graph of the system being protected back to a trusted operational state before a detected compromise by a cyber threat occurred in the protected system in order to assist in a recovery from the cyber threat.

Figure 4:
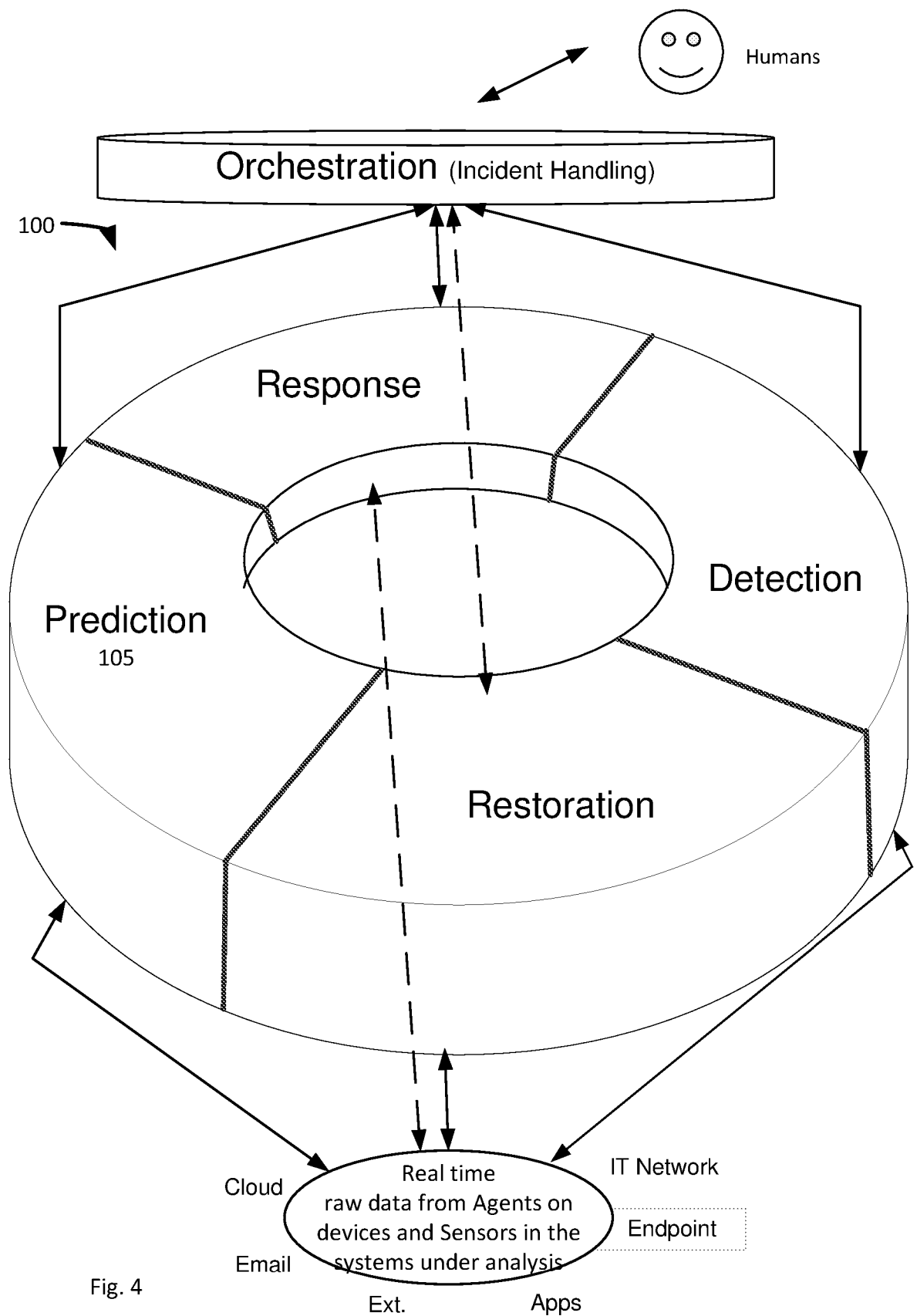

FIG. 4 illustrates a block diagram of an embodiment of an intelligent orchestration module configured to facilitate an Artificial Intelligence augmented and adaptive interactive response loop between multiple Artificial Intelligence-based engines.

Figure 5:
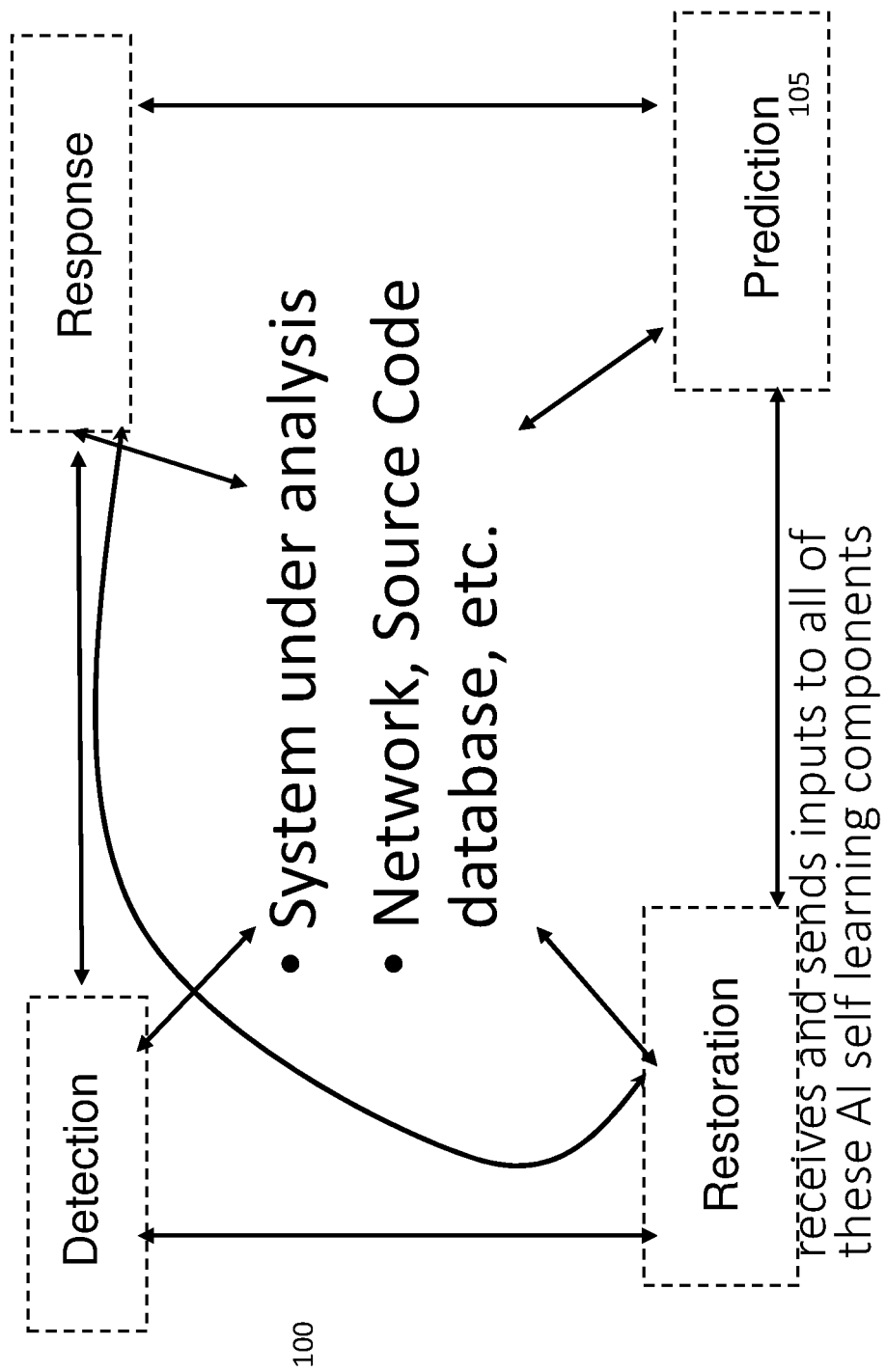

FIG. 5 illustrates a diagram of an embodiment of i) the cyber threat detection engine using Artificial Intelligence algorithms configured and trained to perform a first machine-learned task of detecting the cyber threat, ii) an autonomous response engine using Artificial Intelligence algorithms configured and trained to perform a second machine-learned task of taking one or more mitigation actions to mitigate the cyber threat, iii) a cyber-security restoration engine using Artificial Intelligence algorithms configured and trained to perform a third machine-learned task of remediating the system being protected back to a trusted operational state, and iv) a prediction engine using Artificial Intelligence algorithms configured and trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, working in tandem.

Figure 6:
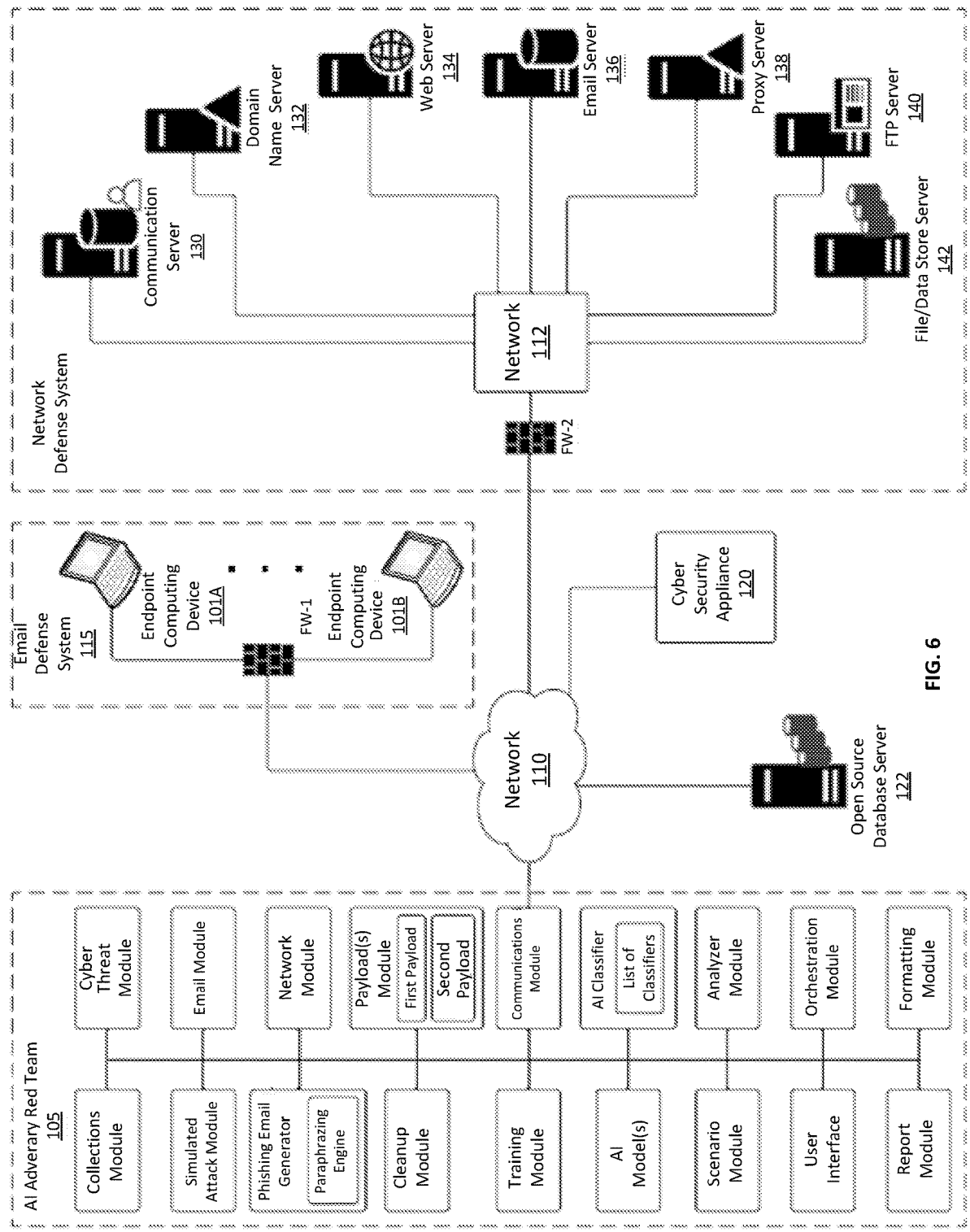

FIG. 6 illustrates a block diagram of an embodiment of the prediction engine with Artificial Intelligence-based simulations conducted in the prediction engine by constructing a graph of nodes of the system being protected (e.g. a network including i) the physical devices connecting to the network, any virtualize machines of the network, user accounts in the network, email accounts in the network, etc. as well as ii) connections and pathways through the network) to create a simulated version of the system to be tested.

Figure 7:
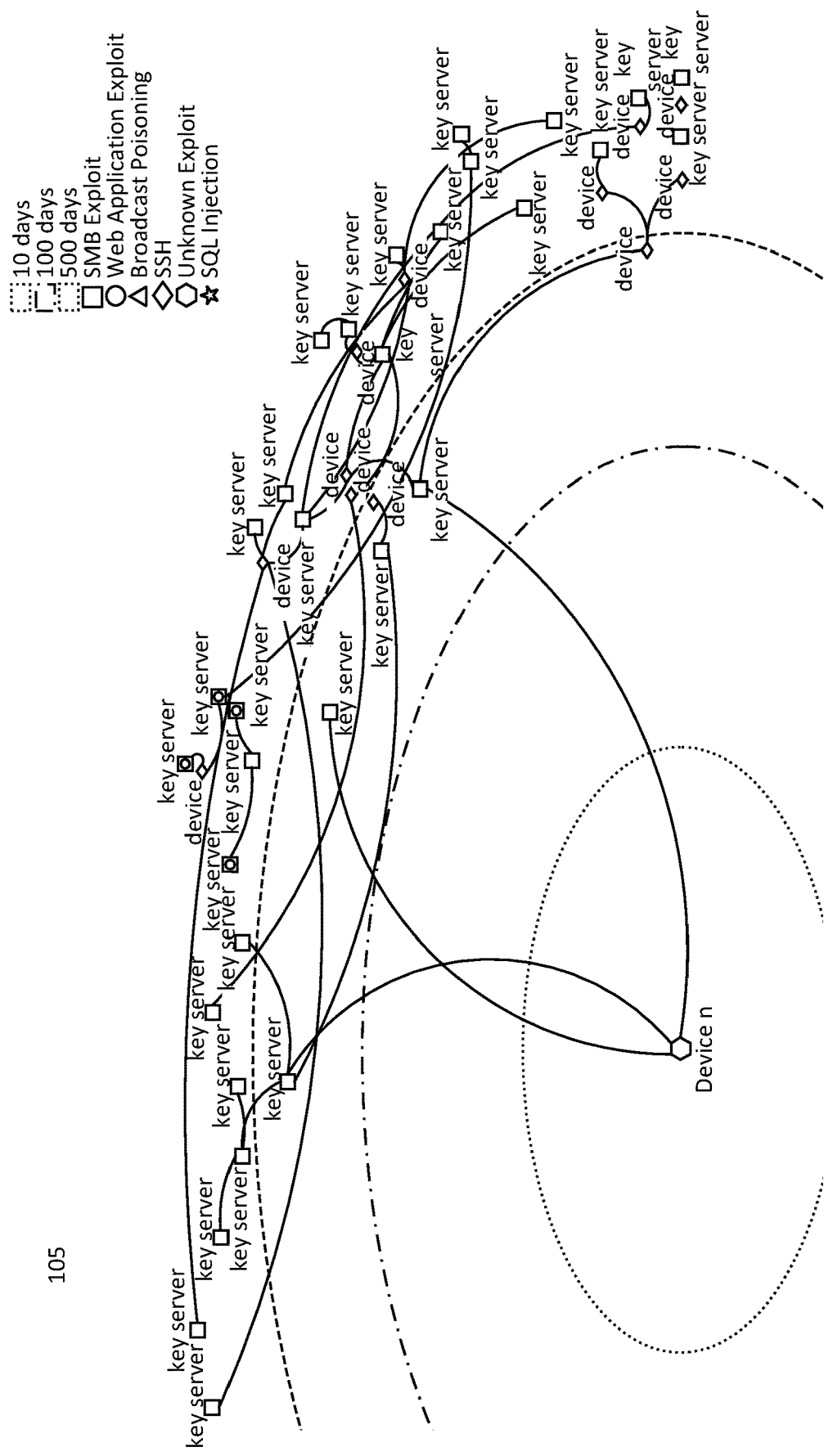

FIG. 7 illustrates a diagram of an embodiment of a cyber threat prediction engine and its Artificial Intelligence-based simulations constructing a graph of nodes in an example network and simulating how the cyberattack might likely progress in the future tailored with an innate understanding of a normal behavior of the nodes in the system being protected and a current operational state of each node in the graph of the protected system during simulations of cyberattacks.

Figure 8:
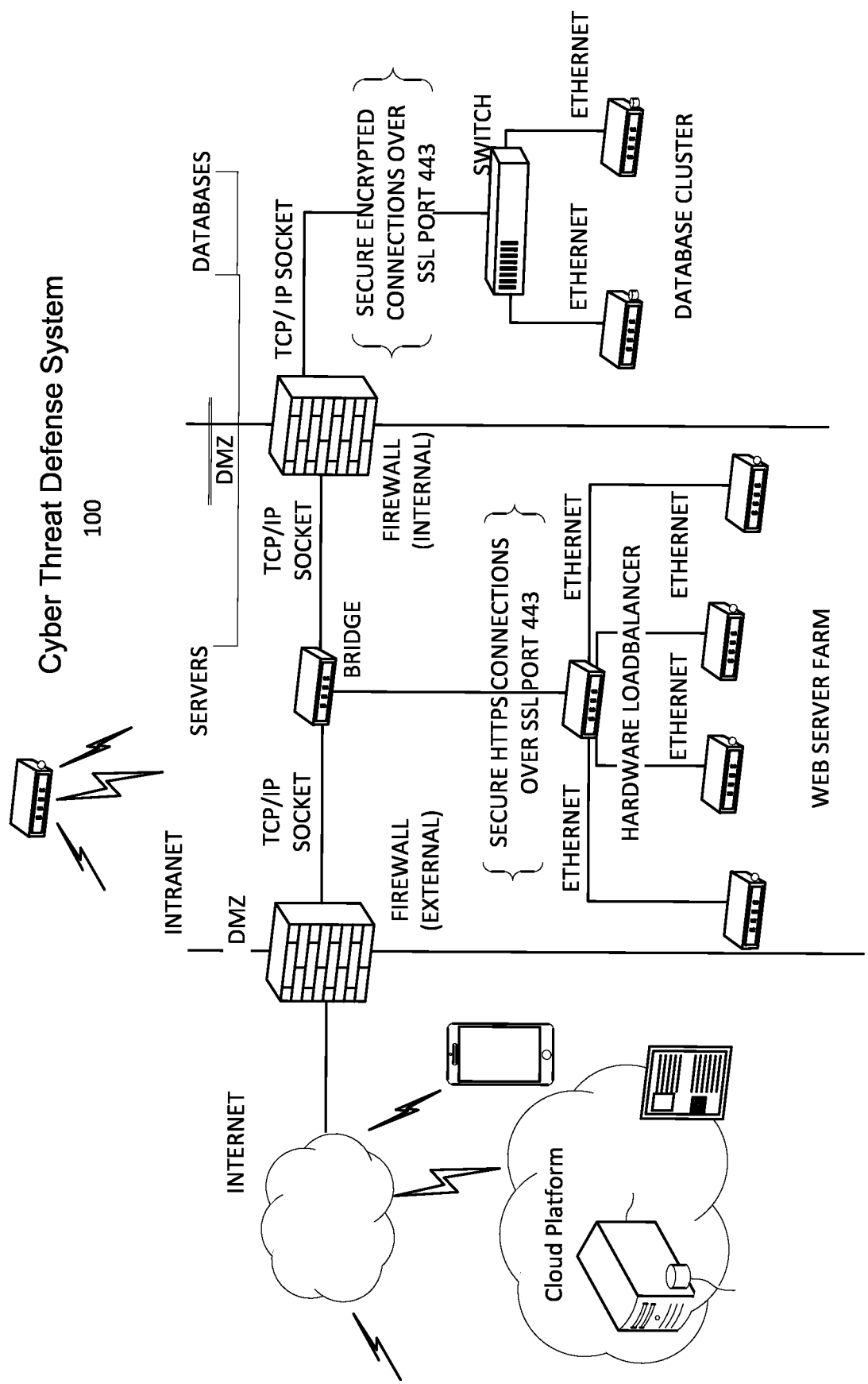

FIG. 8 illustrates a block diagram of an embodiment of the AI-based cyber security appliance with the cyber security restoration engine and other Artificial Intelligence-based engines plugging in as an appliance platform to protect a system.

FIG. 9 to FIG. 14 illustrate diagrams of an embodiment of an intelligent orchestration module facilitating an example an Artificial Intelligence augmented and adaptive interactive response loop between the example four Artificial Intelligence-based engines.

Figure 15:
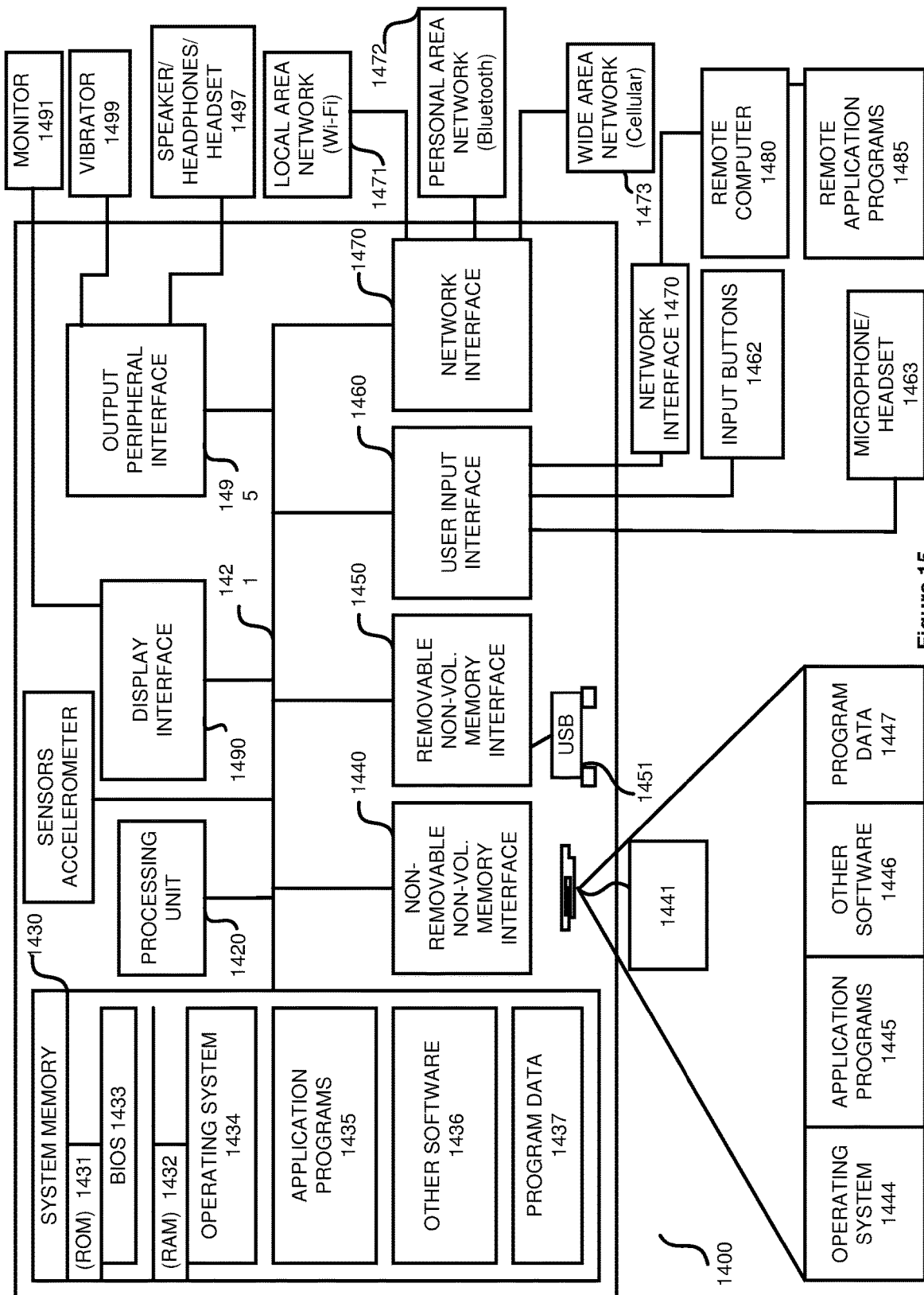

FIG. 15 illustrates a block diagram of an embodiment of one or more computing devices that can be a part of the Artificial Intelligence-based cyber security system including the multiple Artificial Intelligence-based engines discussed herein.

Figure 16:
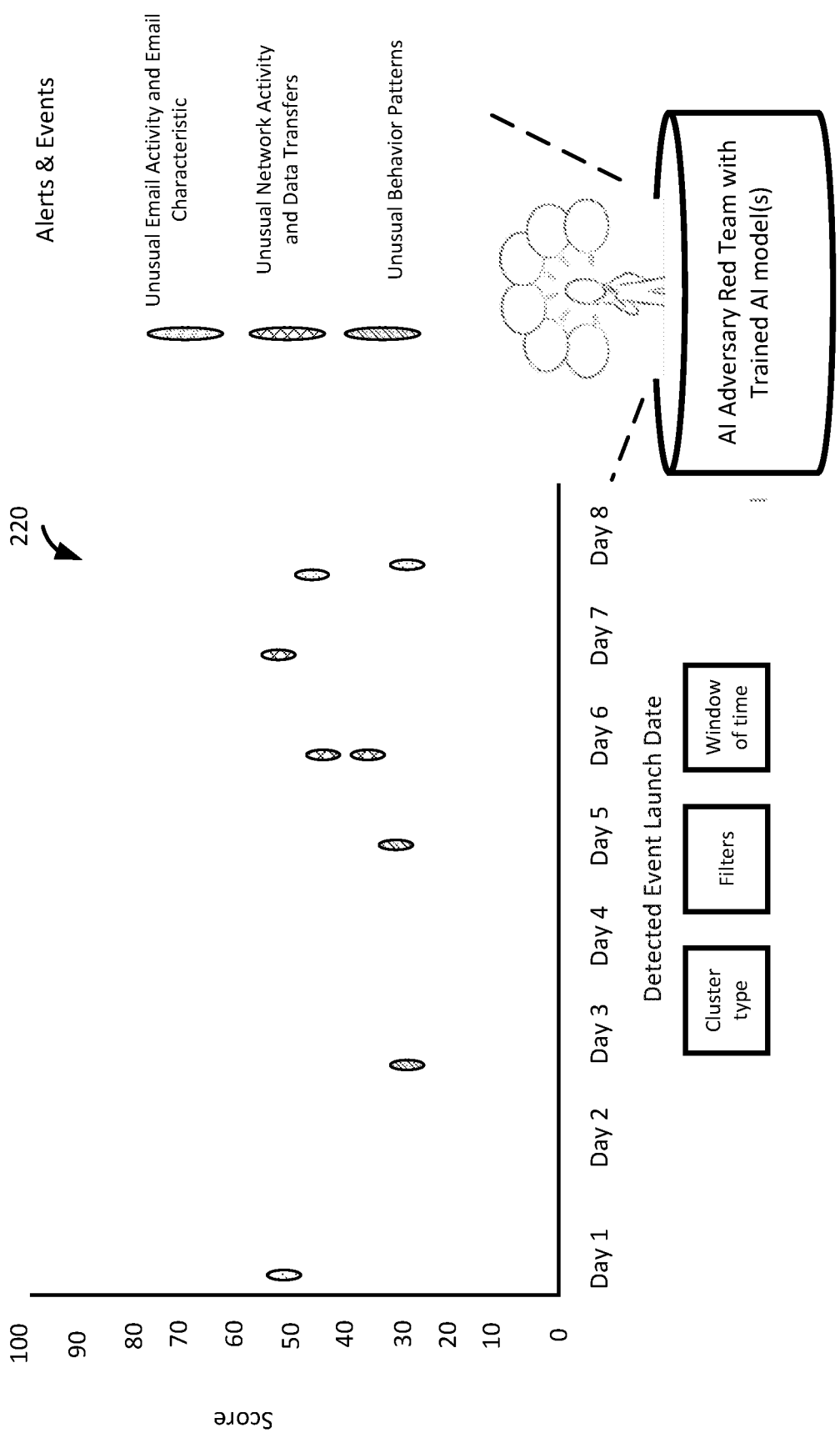

FIG. 16 illustrates a graph of an embodiment of an example chain of unusual behavior for, in this example, the email activities and IT network activities deviating from a normal pattern of life in connection with the rest of the system/network under analysis.

Figure 17:
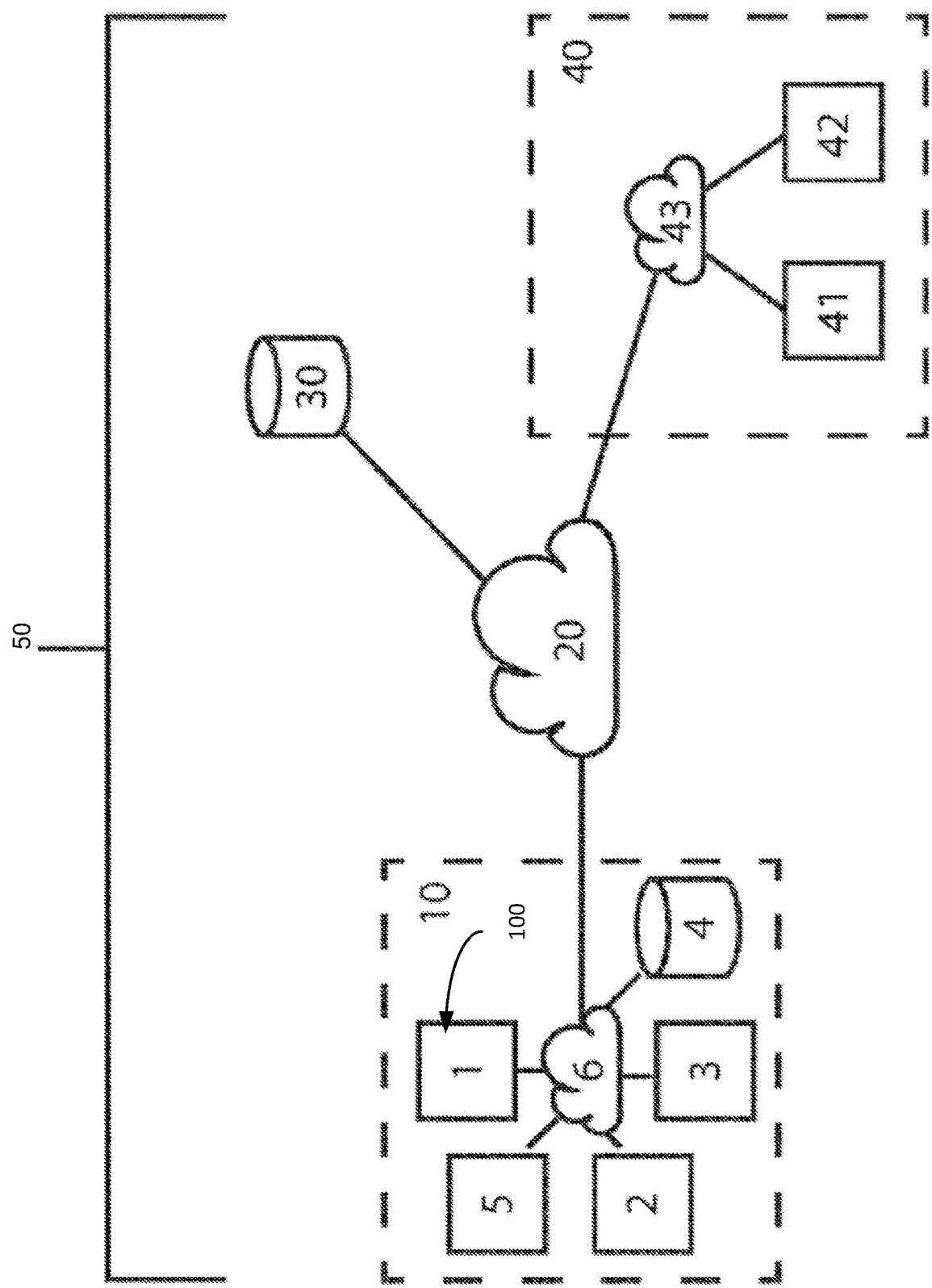

FIG. 17 illustrates a diagram of an embodiment of the cyber security restoration engine cooperating with the other Artificial Intelligence-based engines in a cyber security appliance to track and understand the cyber threat identified by the other Artificial Intelligence-based engines as well as track the one or more mitigation actions taken to mitigate the cyber threat during the cyberattack by the other Artificial Intelligence-based engines in order to assist in intelligently restoring the protected system, while still mitigating the cyber threat attack, back to a trusted operational state.

While the design is subject to various modifications, equivalents, and alternative forms, specific embodiments thereof have been shown by way of example in the drawings and will now be described in detail. It should be understood that the design is not limited to the particular embodiments disclosed, but-on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

An intelligent orchestration module can facilitate an Artificial Intelligence augmented and adaptive interactive response loop between multiple Artificial Intelligence-based engines. The multiple Artificial Intelligence-based engines include a cyber threat detection engine and one or more of an autonomous response engine, a cyber-security restoration engine, and a prediction engine. The cyber threat detection engine can be configured with software code, electronic hardware, as well as the use of Artificial Intelligence algorithms configured and trained to perform a first machine-learned task of detecting a cyber threat based on behavioral metrics associated with one or more nodes in a system being protected. The autonomous response engine can be configured with software code, electronic hardware, as well as the use of Artificial Intelligence algorithms configured and trained to perform a second machine-learned task of taking one or more mitigation actions to mitigate the detected cyber threat. The cyber-security restoration engine can be configured with software code, electronic hardware, as well as the use of Artificial Intelligence algorithms configured and trained to perform a third machine-learned task of taking one or more remediation actions to remediate one or more nodes in the system being protected back to a trusted operational state. The prediction engine can be configured with software code, electronic hardware as well as the use of Artificial Intelligence algorithms configured and trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack. The multiple Artificial Intelligence-based engines have communication hooks in between them to bilaterally exchange the behavioral metrics between the multiple Artificial Intelligence-based engines to work together to provide an overall cyber threat response during the ongoing cyberattack in light of simulations of the cyberattack to predict what might occur in the nodes in the system based on, at least one of, i) the mitigation actions taken and ii) the restoration actions taken. The outcomes that each engine can create are changed and improved over time from their initial capabilities as a result of further processing made possible by prior outputs of the other engines, as well as by changes in the cyberattack being monitored.

Figure 1:
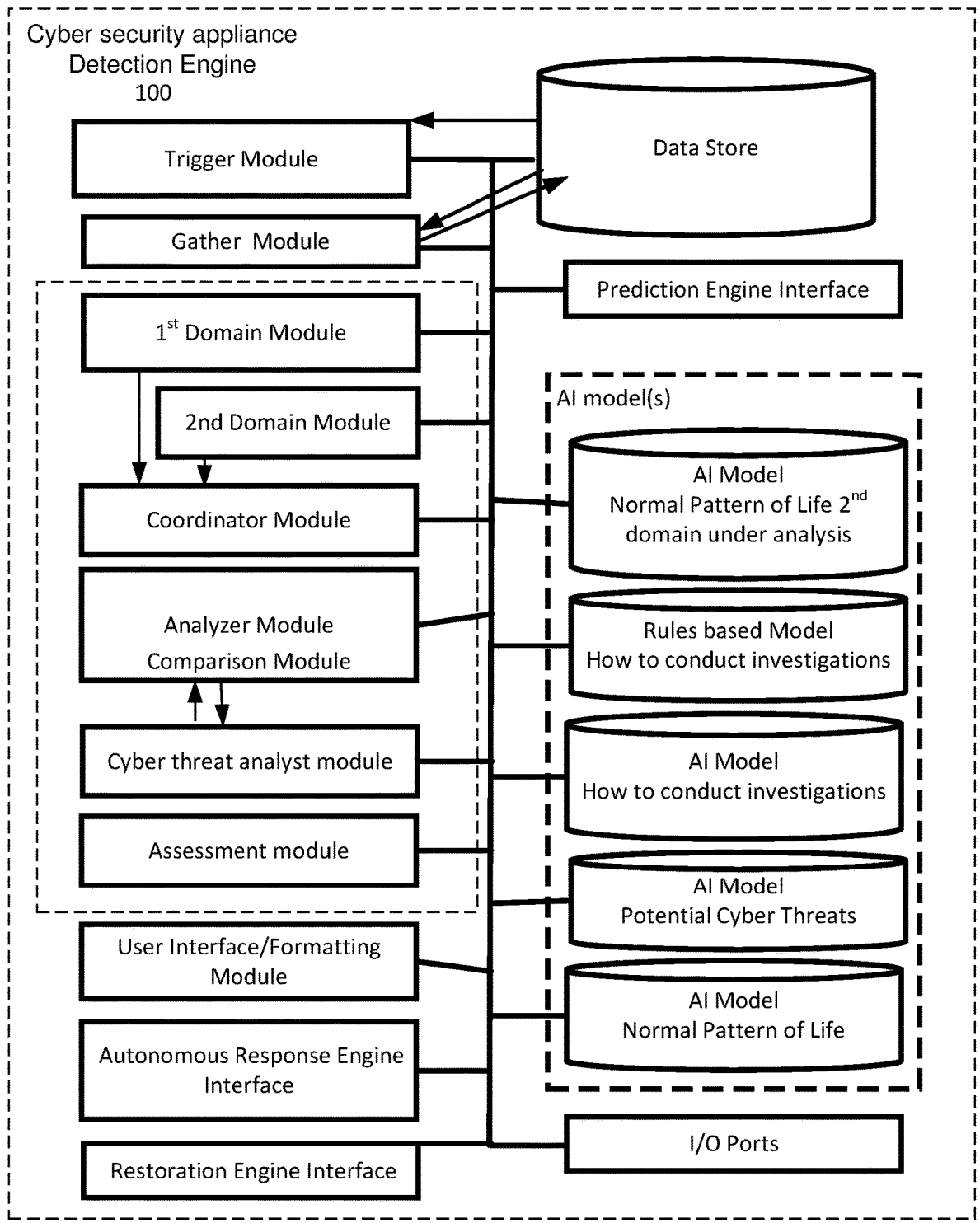
FIG. 1 illustrates a block diagram of an embodiment of the AI-based cyber security appliance with example components making up a detection engine that protects a system, including but not limited to a network/domain, from cyber threats.

FIG. 1 illustrates a block diagram of an embodiment of the AI-based cyber security appliance with example components making up a detection engine that protects a system, including but not limited to a network/domain, from cyber threats. Various Artificial Intelligence models and modules of the cyber security appliance 100 cooperate to protect a system, such as one or more networks/domains under analysis, from cyber threats. The AI-based cyber security appliance 100 may include a trigger module, a gatherer module, an analyzer module, a cyber threat analyst module, an assessment module, a formatting module, one or more AI models trained with machine learning on a normal pattern of life for entities in the network/domain under analysis, one or more AI models trained with machine learning on cyber threat hypotheses to form and investigate a cyber threat hypothesis on what are a possible set of cyber threats and their characteristics, symptoms, remediations, etc., and one or more AI models trained on possible cyber threats and their characteristics, symptoms, a data store, an interface to an autonomous response engine, a 1st domain module, a 2nd domain module, and a coordinator module, a data store, an interface to a restoration engine, an interface to a prediction engine, and other similar components.

The cyber threat detection engine includes a set of modules cooperating with one or more Artificial Intelligence models configured to perform a machine-learned task of detecting a cyber threat incident. The detection engine uses the set of modules cooperating with the one or more Artificial Intelligence models to detect anomalous behavior of one or more nodes, including at least user accounts, devices, and versions of source code files, in a graph of a system being protected. The detection engine uses the set of modules cooperating with the one or more Artificial Intelligence models to prevent a cyber threat from compromising the nodes and/or spreading through the nodes of the system.

The cyber security appliance 100 with the Artificial Intelligence (AI)-based cyber security system may protect a system from a cyber threat (insider attack, malicious files, malicious emails, etc.). In an embodiment, the cyber security appliance 100 can protect all of the devices on the network(s)/domain(s) being monitored by monitoring domain activity. For example, a network domain module may communicate with network sensors to monitor network traffic going to and from the devices on the network. The steps below will detail the activities and functions of several of the components in the cyber security appliance 100.

A data gather module may have a series of one or more process identifier classifiers. A process identifier classifier can identify and track each process and device in the network, under analysis, making communication connections. A data store cooperates with the process identifier classifier to collect and maintain historical data of processes and their connections, which is updated over time as the network is in operation. Individual processes may be present in merely one or more domains being monitored. In an example, the process identifier classifier can identify each process running on a given device along with its endpoint connections, which are stored in the data store.

An analyzer module can cooperate with other modules and AI models in the cyber security appliance to confirm a presence of a cyber threat attacking one or more domains in an organization's system. A cyber threat analyst module can cooperate with the same other modules and AI models in the cyber security appliance to conduct a long-term investigation and/or a more in-depth investigation on potential cyber threats attacking one or more domains in an organization's system. A process identifier in the analyzer module can cooperate with the data gatherer module to collect any additional data and metrics to support a possible cyber threat hypothesis. The analyzer module and/or the cyber threat analyst module can also look for other anomalies, such as model breaches, including, for example, deviations for a normal behavior of an entity, and other techniques discussed herein. The analyzer module and/or the cyber threat analyst module can cooperate with the AI models trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

The cyber threat analyst module in essence allows two levels of investigations of potential cyber threat attacks. In a first level, the analyzer module and AI models can rapidly detect and then the autonomous response engine will autonomously respond to overt and obvious cyber threat attacks. However, thousands to millions of low-level anomalies occur in a domain under analysis all of the time; and thus, most other systems need to set the threshold of trying to detect a cyber threat attack at level higher than the low-level anomalies examined by the cyber threat analyst module just to not have too many false positive indications of a cyber threat attack when one is not actually occurring, as well as to not overwhelm a human cyber analyst receiving the alerts with so many notifications of low-level anomalies that they just start tuning out those alerts. However, advanced persistent threats attempt to avoid detection by making these low-level anomalies in the system over time during their cyberattack before making their final coup de grace/ultimate mortal blow against the system (e.g. domain) being protected. The cyber threat analyst module also conducts a second level of investigations over time with the assistance of the AI models trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Note, a data analysis process can be algorithms/scripts written by humans to perform their function discussed herein; and, can in various cases use AI classifiers as part of their operation. The cyber threat analyst module forms in conjunction with the AI models trained with machine learning on how to form cyber threat hypotheses and how to conduct investigations for a cyber threat hypothesis investigate hypotheses on what are a possible set of cyber threats. They can also cooperate with the analyzer module with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the one or more AI models trained with machine learning on the normal pattern of life of entities in the system. (For example, see FIG. 16, the cyber threat analyst module will perform several additional rounds of gathering additional information, including abnormal behavior, over a period of time, in this example, examining data over a 7 day period to determine causal links between the information.) For example, causal links between a series of IT network actives causally linked to email activities. The cyber threat analyst module will submit to check and recheck various combinations/a chain of potentially related information, including abnormal behavior of a device/user account/etc. under analysis until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted; and thus, needs a human cyber security team to further investigate the anomaly of interest included in the chain of potentially related information.

Again, an input from the cyber threat analyst module of a supported hypothesis of a potential cyber threat will trigger the analyzer module to compare, confirm, and send a signal to act upon and mitigate that cyber threat. In contrast, the cyber threat analyst module investigates subtle indicators and/or initially seemingly isolated unusual or suspicious activity such as a worker is logging in after their normal working hours or a simple system misconfiguration has occurred. Most of the investigations conducted by the cyber threat analyst module cooperating with the AI models trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically during the investigations, several rounds of data gathering to support or refute the long list of potential cyber threat hypotheses formed by the cyber threat analyst module will occur before the algorithms in the cyber threat analyst module will determine whether a particular cyber threat hypothesis is supported, refuted, or needs further investigation by a human. The rounds of data gathering will build chains of linked low-level indicators of unusual activity along with potential activities that could be within a normal pattern of life for that entity to evaluate the whole chain of activities to support or refute each potential cyber threat hypothesis formed. (See again, for example, FIG. 16 and a chain of linked low-level indicators, including abnormal behavior compared to the normal patten of life for that entity, all under a 50 on a threat indicator score). The investigations by the cyber threat analyst module can happen over a relatively long period of time and be far more in depth than the analyzer module which will work with the other modules and AI models to confirm that a cyber threat has in fact been detected.

The data gatherer module may further extract data from the data store at the request of the cyber threat analyst module and/or analyzer module on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The data gatherer module cooperates with the cyber threat analyst module and/or analyzer module to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module is configured to cooperate with the AI models trained with machine learning on how to form cyber threat hypotheses and how to conduct investigations for a cyber threat hypothesis to form and investigate hypotheses on what are a possible set of cyber threats and then can cooperate with the analyzer module with the one or more data analysis processes to confirm the results of the investigation on the possible set of cyber threats hypotheses that would include the at least one of i) the abnormal behavior, ii) the suspicious activity, and iii) any combination of both, identified through cooperation with the one or more AI models trained with machine learning on the normal pattern of life/normal behavior of entities in the domains under analysis.

Note, in the first level of threat detection, the data gatherer module and the analyzer module cooperate to supply any data and/or metrics requested by the analyzer module cooperating with the AI models trained on possible cyber threats to support or rebut each possible type of cyber threat. Again, the analyzer module can cooperate with the other modules and AI models to rapidly detect and then cooperate with an autonomous response module to autonomously respond to overt and obvious cyber threat attacks, (including ones found to be supported by the cyber threat analyst module).

As a starting point, the AI-based cyber security appliance 100 can use multiple modules, each capable of identifying abnormal behavior and/or suspicious activity against the AI models of normal behavior for the entities in the network/domain under analysis, which is supplied to the analyzer module and/or the cyber threat analyst module. The analyzer module and/or the cyber threat analyst module may also receive other inputs such as AI model breaches, AI classifier breaches, a trigger to start an investigation from an external source, etc.

Many other model breaches of the AI models trained with machine learning on the normal behavior of the system can send an input into the cyber threat analyst module and/or the trigger module to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v) etc.

Note, the cyber threat analyst module cooperating with the AI models trained with machine learning on how to form cyber threat hypotheses and how to conduct investigations for a cyber threat hypothesis in the AI-based cyber security appliance 100 provides an advantage as it reduces the time taken for human led or cybersecurity investigations, provides an alternative to manpower for small organizations and improves detection (and remediation) capabilities within the cyber security appliance 100.

The cyber threat analyst module that forms and investigates hypotheses on what are the possible set of cyber threats can use hypotheses mechanisms including any of 1) one or more AI models trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI models trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module and/or the analyzer module can feed the cyber threat details to an assessment module to generate a threat risk score that indicate a level of severity of the cyber threat.

The multiple Artificial Intelligence-based engines each have an interface to communicate with the other separate Artificial Intelligence-based engines. Each Intelligence-based engine has an interface to communicate with another separate Artificial Intelligence-based engine, which is configured to understand a type of information and communication that this other separate Artificial Intelligence-based engine needs to make determinations on an ongoing cyber-attack from that other Artificial Intelligence-based engine's perspective. The autonomous response engine works with the assessment module in the detection engine when the cyber threat is detected and autonomously takes one or more actions to mitigate the cyber threat. FIG. 1 shows the example components making up the detection engine to include interfaces to the prediction engine, the autonomous response engine, and the restoration engine.

The cyber threat detection engine can also have an anomaly alert system in a formatting module configured to report out anomalous incidents and events as well as the cyber threat detected to a display screen viewable by a human cyber-security professional. Each Artificial Intelligence-based engine has a rapid messaging system to communicate with a human cyber-security team to keep the human cyber-security team informed on actions autonomously taken and actions needing human approval to be taken.

Figure 2:
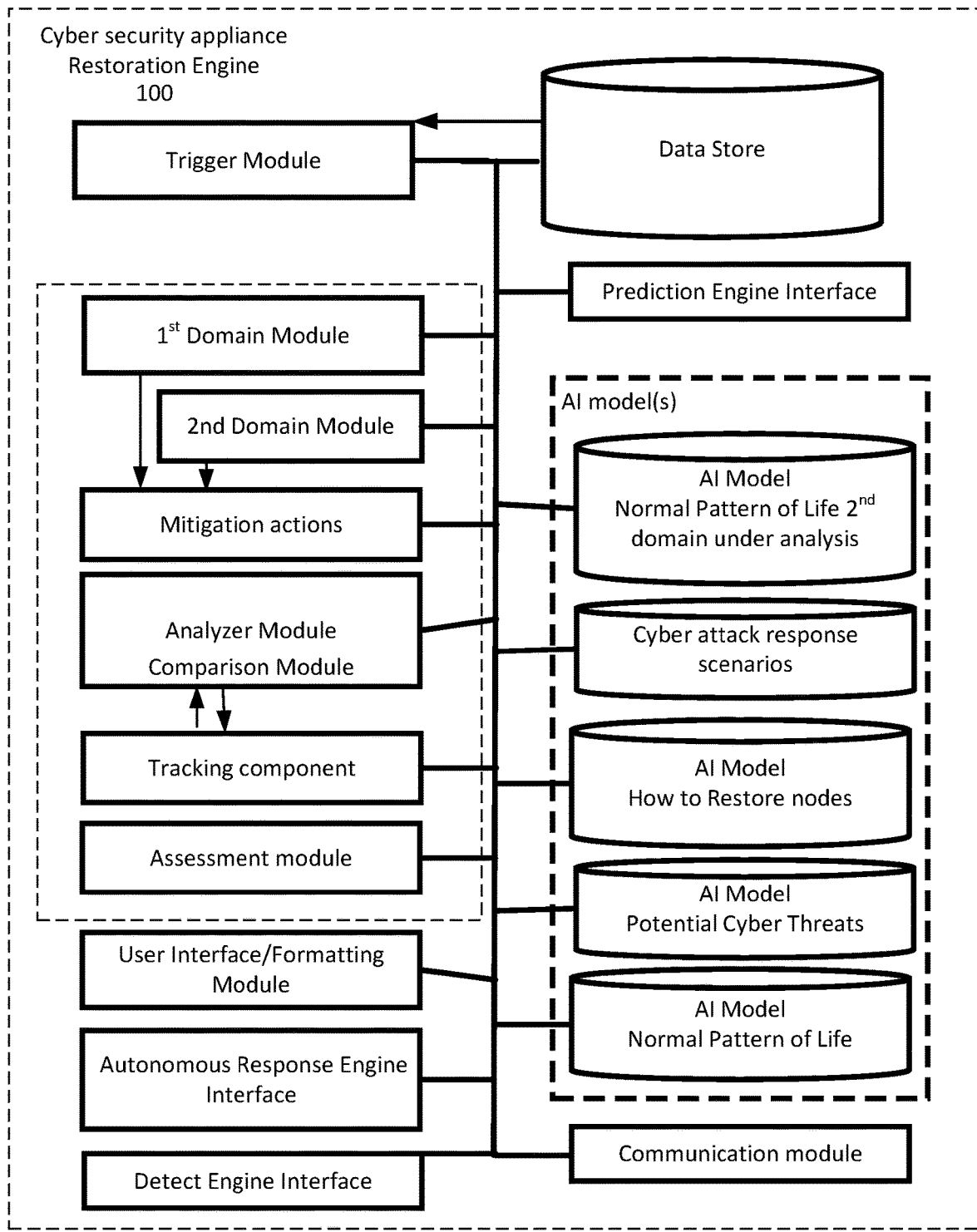
FIG. 2 illustrates a block diagram of an embodiment of the AI-based cyber security appliance with example components making up a cyber security restoration (e.g. self-healing) engine that takes one or more autonomous remediation actions to recover from a cyberattack from a cyber threat.

FIG. 2 illustrates a block diagram of an embodiment of the AI-based cyber security appliance with example components making up a cyber security restoration (e.g. self-healing) engine that takes one or more autonomous remediation actions to recover from a cyberattack from a cyber threat. Note, similarly named components in the cyber security restoration engine can operate and function similar to as described for the detection engine.

The cyber security restoration engine is configured to take one or more remediation actions based on configured and/or Artificial Intelligence assistance to remediate the one or more nodes in the graph of the system being protected back to a trusted operational state in a recovery from the cyber threat. These actions might be fully automatic, or require a specific human confirmation decision before they begin.

The cyber security restoration engine is configured to cooperate with the other AI-based engines of the cyber security system, via the interfaces and/or direct integrations, to track and understand the cyber threat identified by the other components as well as track the one or more mitigation actions taken to mitigate the cyber threat during the cyber-attack by the other components in order to assist in intelligently restoring the protected system while still mitigating the cyber threat attack back to a trusted operational state; and thus, as a situation develops with an ongoing cyberattack, the cyber security restoration engine is configured to take one or more remediation actions to remediate (e.g. restore) at least one of the nodes in the graph of the protected system back to a trusted operational state while the cyberattack is still ongoing.

The cyber security restoration engine has a tracking component that includes at least one of i) a database to keep a record and track an operational state of each node in the graph of the protected system, ii) an Artificial Intelligence model trained to track the operational state of each node in the graph of the protected system, iii) a query to another artificial intelligence based engine that tracks the operational state of each node in the graph of the protected system from a different perspective, and iv) a combination of any of these, so that the cyber security restoration engine can then take the one or more autonomous remediation actions to remediate each particular node (e.g. user account and/or device) back to a trusted operational state for that node.

The cyber security restoration engine can cooperate with the other Artificial Intelligence-based engines of the cyber security system to track and understand the cyber threat identified by the other Artificial Intelligence-based engines (detection engine and/or the prediction engine) as well as track the one or more mitigation actions taken to mitigate the cyber threat during the cyberattack by an autonomous response engine and/or human cyber security team members in order to assist in intelligently restoring the protected system while still mitigating the cyber threat attack back to a trusted operational state. Thus, as a situation develops with an ongoing cyberattack, the cyber security restoration engine is configured to take the one or more remediation actions to remediate at least one of the nodes in the graph of the protected system back to a trusted operational state to restore portions of the protected system while the cyberattack is still ongoing. The cyber security restoration engine restores the affected nodes in the protected system by using incident modelling in the cyber threat analyst module (e.g. AI Analyst) to map and identify an entire lifecycle of attack, work with the AI models trained on cyber security threats in the detection engine to identify a source of the cyberattack, and recommend restore points (e.g. where in the protected system remediation action is needed).

The communication module can cooperate with the cyber security restoration engine to communicate with the other Artificial Intelligence-based engines of the cyber security system. Again, the machine-learned tasks of the other Artificial Intelligence-based engines can include i) identifying the cyber threat itself and ii) taking one or more mitigation actions to mitigate the cyber threat during a cyberattack by the cyber threat. The communication module also communicates with one or more third party external backup and/or recovery services and systems to invoke backup remediation actions and recovery remediation actions to remediate the nodes from the cyber threat back to a trusted operational state, for example but not limited to the state before the detected compromise by the cyber threat occurred in the protected system. For example, the cyber security restoration engine can send a command to third party back up providers to invoke a full backup of a complete copy of all the files, folders, and operational settings for a device in the system. The cyber security restoration engine can use one or more Application Programming Interfaces (APIs) to translate desired remediation actions for the particular nodes in the system (e.g. its devices from potentially multiple different vendors, user accounts, etc.) being protected devices into a specific language and syntax utilized by the third party external backup and/or recovery services and systems to invoke the backup remediation actions and recovery remediation actions to remediate the nodes. In addition, the cyber security restoration engine can send a request to the human cyber security team to take similar actions where it has no direct capability to do so itself but can recommend the remediation and recovery steps. In another example, the external 3rd party backup and/or recovery services and systems can include, for example, cloud data recovery, desktop and server backups to take disk images of hardware to restore all of the settings and data prior to an attack, and other forms of salvaging deleted, inaccessible, lost, corrupted, damaged, or formatted data and operational settings from these recovery services, switching to back up systems when the main system has been disrupted, etc.

All of the Artificial Intelligence-based engines are configured to have bi-directional communications with the other Artificial Intelligence-based engines as well as with agents and sensors within the protected system under analysis. The communication module can use an instant messaging application between the cyber security restoration engine and members of a human cyber security team to report autonomous remediation actions taken by the cyber security restoration engine to restore the one or more nodes as well as proposed remediation actions needing the human cyber security team's authorization to remediate the one or more nodes in the protected system back to a trusted operational state. It may also use similar messaging applications to inform IT teams or other relevant but non cyber security teams that they need to take actions.

The cyber security restoration engine can reference both i) a database of restoration response scenarios stored in the database and ii) a prediction engine configured to run Artificial Intelligence-based simulations and use the operational state of each node in the graph of the protected system during simulations of cyberattacks on the protected system to restore 1) each node compromised by the cyber threat and 2) promote protection of the corresponding nodes adjacent to a compromised node in the graph of the protected system.

The cyber security restoration engine can prioritize among the one or more nodes to restore, which nodes to remediate and an order of the nodes to remediate, based on two or more factors including i) a dependency order needed for the recovery efforts, ii) an importance of a particular recovered node compared to other nodes in the system being protected, iii) a level of compromise of a particular node contemplated to be restored, iv) an urgency to recover that node compared to whether containment of the cyber threat was successful, v) a list of a most important things in the protected system to recover earliest, and vi) factoring in a result of a cyberattack simulation being run during the cyberattack by a prediction engine to predict a likely result regarding the cyberattack when that node is restored.

FIG. 3 illustrates a block diagram of an embodiment of the cyber security restoration engine configured to take one or more autonomous remediation actions based on Artificial Intelligence assistance to remediate one or more nodes in the graph of the system being protected back to a trusted operational state before a detected compromise by a cyber threat occurred in the protected system in order to assist in a recovery from the cyber threat.

As discussed, the communication module can be configured to communicate also with one or more external 3rd party backup and/or recovery services and systems to invoke backup remediation actions and recovery remediation actions to remediate the nodes from the cyber threat and restore likely affected users and devices in the protected system back to a trusted operational state. The external 3rd party backup and/or recovery services and systems receive instructions from the cyber security restoration engine to invoke specific and tailored backup remediation actions and recovery remediation actions to remediate the nodes from the cyber threat while still containing the cyber threat itself. As shown, the cyber security restoration engine can generate and maintain a graph of nodes making up the system under analysis.

FIG. 4 illustrates a block diagram of an embodiment of an intelligent orchestration module configured to facilitate an Artificial Intelligence augmented and adaptive interactive response loop between the multiple Artificial Intelligence-based engines. The example multiple Artificial Intelligence-based engines cooperating with each other can include i) the cyber threat detection engine, ii) an autonomous response engine, iii) a cyber-security restoration engine, and iv) a prediction engine. i) The cyber threat detection engine can be configured to use Artificial Intelligence algorithms trained to perform a machine-learned task of detecting the cyber threat. (See for example FIG. 1) ii) The autonomous response engine can be configured to use Artificial Intelligence algorithms trained to perform a machine-learned task of taking one or more mitigation actions to mitigate the cyber threat. iii) The cyber-security restoration engine can be configured to use Artificial Intelligence algorithms trained to perform a machine-learned task of remediating the system being protected back to a trusted operational state. (See for example FIG. 2) iv) The prediction engine can be configured to use Artificial Intelligence algorithms trained to perform a machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack. (See, for example, FIG. 6)

The multiple Artificial Intelligence-based engines have communication hooks in between them to exchange a significant amount of behavioral metrics including data between the multiple Artificial Intelligence-based engines to work together to provide an overall cyber threat response.

The intelligent orchestration module can be configured as a discrete intelligent orchestration module that exists on top of the multiple Artificial Intelligence-based engines to orchestrate the overall cyber threat response and an interaction between the multiple Artificial Intelligence-based engines, each configured to perform its own machine-learned task. Alternatively, the intelligent orchestration module can be configured as a distributed collaboration with a portion of the intelligent orchestration module implemented in each of the multiple Artificial Intelligence-based engines to orchestrate the overall cyber threat response and an interaction between the multiple Artificial Intelligence-based engines. In an embodiment, whether implemented as a distributed portion on each AI engine or a discrete AI engine itself, the intelligent orchestration module can use self-learning algorithms to learn how to best assist the orchestration of the interaction between itself and the other AI engines, which also implement self-learning algorithms themselves to perform their individual machine-learned tasks better.

The multiple Artificial Intelligence-based engines can be configured to cooperate to combine an understanding of normal operations of the nodes, an understanding emerging cyber threats, an ability to contain those emerging cyber threats, and a restoration of the nodes of the system to heal the system with an adaptive feedback between the multiple Artificial Intelligence-based engines in light of simulations of the cyberattack to predict what might occur in the nodes in the system based on the progression of the attack so far, mitigation actions taken to contain those emerging cyber threats and remediation actions taken to heal the nodes using the simulated cyberattack information.

One or more Artificial Intelligence models in the detection engine can be configured to maintain what is considered to be normal behavior for that node, which is constructed on a per node basis, on the system being protected from historical data of that specific node over an operation of the system being protected.

The multiple Artificial Intelligence-based engines each have an interface to communicate with the other separate Artificial Intelligence-based engines configured to understand a type of information and communication that the other separate Artificial Intelligence-based engine needs to make determinations on an ongoing cyberattack from that other Artificial Intelligence-based engine's perspective. Each Artificial Intelligence-based engine has an instant messaging system to communicate with a human cybersecurity team to keep the human cyber-security team informed on actions autonomously taken and actions needing human approval as well as generate reports for the human cyber-security team.

FIG. 5 illustrates a diagram of an embodiment of i) the cyber threat detection engine using Artificial Intelligence algorithms trained to perform a first machine-learned task of detecting the cyber threat, ii) an autonomous response engine using Artificial Intelligence algorithms trained to perform a second machine-learned task of taking one or more mitigation actions to mitigate the cyber threat, iii) a cyber-security restoration engine using Artificial Intelligence algorithms trained to perform a third machine-learned task of remediating the system being protected back to a trusted operational state, and iv) a prediction engine using Artificial Intelligence algorithms trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, in order for these four Artificial Intelligence-based engines to work together. In addition, the intelligent orchestration module can use Artificial Intelligence algorithms trained to perform a fifth machine-learned task of adaptive interactive response between the multiple Artificial Intelligence-based engines to provide information each Artificial Intelligence engine needs to work cohesively to provide an overall incidence response that mitigates different types of cyber threats while still minimizing an impact tailored to this particular system being protected. For example, when a conversation occurs between the AI-based engines such as a system that can be positively affected by both proposed mitigation actions and proposed restoration actions, any of which might be attempted but fail or only partially succeed, then the intelligent orchestration module can arbitrate and evolve the best result for this particular system being protected. The intelligent orchestration module can help anticipate i) the needs of and ii) cohesive response of each Artificial Intelligence-based engine based on a current detected cyber threat.

The cyber-security restoration engine receives and sends inputs through communication hooks (e.g.) interfaces to all of these Artificial Intelligence-based engines each configured with self-learning AI machine learning algorithms to, respectively, i) to detect the cyber threat, ii) to respond to mitigate that cyber threat, and iii) to predict how that cyber threat might occur and likely progress through simulations. Each of these Artificial Intelligence-based engines has bi-directional communications, including the exchange of raw data, with each other as well as with software agents resident in physical and/or virtual devices making up the system being protected as well as bi-directional communications with sensors within the system being protected. Note, the system under protection can be, for example, an IT network, an OT network, a Cloud network, an email network, a source code database, an endpoint device, etc.

In an example, the autonomous response engine uses its intelligence to cooperate with a cyber threat prediction engine and its Artificial Intelligence-based simulations to choose and initiate an initial set of one or more mitigation actions indicated as a preferred targeted initial response to the detected cyber threat by autonomously initiating those mitigation actions to defend against the detected cyber threat, rather than a human taking an action. The autonomous response engine, rather than the human taking the action, is configured to autonomously cause the one or more mitigation actions to be taken to contain the cyber threat when a threat risk parameter from an assessment module in the detection engine is equal to or above an actionable threshold. Example mitigation actions can include 1) the autonomous response engine monitoring and sending signals to a potentially compromised node to restrict communications of the potentially compromised node to merely normal recipients and types of communications according to the Artificial Intelligence model trained to model the normal pattern of life for each node in the protected system, 2) the autonomous response engine trained on how to isolate a compromised node as well as to take mitigation acts with other nodes that have a direct nexus to the compromised node.

In another example, the cyber threat prediction engine and its Artificial Intelligence-based simulations use intelligence to cooperate with the cyber-security restoration engine to assist in choosing one or more remediation actions to perform on nodes affected by the cyberattack back to a trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to a trusted operational state.

In another example, the cyber security restoration engine restores the one or more nodes in the protected system by cooperating with at least two or more of 1) an Artificial Intelligence model trained to model a normal pattern of life for each node in the protected system, 2) an Artificial Intelligence model trained on what are a possible set of cyber threats and their characteristics and symptoms to identify the cyber threat (e.g. malicious actor/device/file) that is causing a particular node to behave abnormally (e.g. malicious behavior) and fall outside of that node's normal pattern of life, and 3) the autonomous response engine.

FIG. 6 illustrates a block diagram of an embodiment of the prediction engine with Artificial Intelligence-based simulations conducted in the prediction engine by constructing a graph of nodes of the system being protected (e.g. a network including i) the physical devices connecting to the network, any virtualized instances of the network, user accounts in the network, email accounts in the network, etc. as well as ii) connections and pathways through the network) to create a virtualized instance of the network to be tested. As shown in FIG. 6, the various cooperating modules residing in the prediction engine 105 may include, but are not limited to, a collections module, a cyberattack generator (e.g. phishing email generator with a paraphrasing engine), an email module, a network module, an analyzer module, a payloads module with first and second payloads, a communication module, a training module, a simulated attack module, a cleanup module, a scenario module, a user interface, a reporting module, a formatting module, an orchestration module, an AI classifier with a list of specified classifiers.

The prediction engine 105 may be implemented via i) a simulator to model the system being protected and/or ii) a clone creator to spin up a virtual network and create a virtual clone of the system being protected configured to pentest one or more defenses provided by the cyber security appliance 100. The prediction engine 105 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data. The prediction engine 105 may use the trained AI models to cooperate with one or more AI classifier(s) by producing a list of specific organization-based classifiers for the AI classifier. The prevent engine 105 is further configured to calculate,-based at least in part on the results of the one or more hypothetical simulations of a possible cyberattack and/or of an actual ongoing cyberattack from a cyber threat determine a risk score for each node (e.g. each device, user account, etc.), the threat risk score being indicative of a possible severity of the compromise prior to an autonomous response action is taken in response to the actual cyberattack of the cyber incident.

FIG. 7 illustrates a diagram of an embodiment of the cyber threat prediction engine and its Artificial Intelligence-based simulations constructing an example graph of nodes in an example network and simulating how the cyberattack might likely progress in the future tailored with an innate understanding of a normal behavior of the nodes in the system being protected and a current operational state of each node in the graph of the protected system during simulations of cyberattacks. The prediction engine plots the attack path through the nodes and estimated times to reach critical nodes in the network. The cyberattack simulation modeling is run to identify the routes, difficulty, and time periods from certain entry notes to certain key servers.

Again, similarly named components in each Artificial Intelligence-based engine can 1) perform similar functions and/or 2) have a communication link from that component located in one of the Artificial Intelligence-based engines and then information is needed from that component is communicated to another Artificial Intelligence-based engine that through the interface to that Artificial Intelligence-based engine.

Training of AI Pre-Deployment and then During Deployment

In step 1, an initial training of the Artificial Intelligence model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, the AI model trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model trained on cyber threats can determine whether a potentially unknown threat has been detected via a number of techniques including an overlap of some of the same characteristics and attributes in that category of cyber threats.

A deployed Artificial Intelligence model trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g. user account, device, etc.). Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of one or more Artificial Intelligence models trained on a normal behavior of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models can be implemented with various mechanisms such neural networks, decision trees, etc. and combinations of these.

At its core, the self-learning AI models that model the normal behavior (e.g. a normal pattern of life) of entities in the network mathematically characterizes what constitutes 'normal' behavior, based on the analysis of a large number of different measures of a device's network behavior-packet traffic and network activity/processes including Server access, Data volumes, Timings of events, Credential use, Connection type, volume, and directionality of, for example, uploads/downloads into the network, File type, packet intention, Admin activity, Resource and information requests, command sent, etc.

Clustering Methods

In order to model what should be considered as normal for a device or cloud container, its behavior can be analyzed in the context of other similar entities on the network. The AI models can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'-it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed.

Next, these cyber threats can include, for example: Insider threat-malicious or accidental, Zero-day attacks-previously unseen, novel exploits, latent vulnerabilities, machine-speed attacks-ransomware and other automated attacks that propagate and/or mutate very quickly, Cloud and SaaS-based attacks, other silent and stealthy attacks advance persistent threats, advanced spear-phishing, etc.

Ranking the Cyber Threat

The assessment module can cooperate with the AI models trained on possible cyber threats to use AI algorithms to account for ambiguities by distinguishing between the subtly differing levels of evidence that characterize network data. Instead of generating the simple binary outputs 'malicious' or 'benign', the AI's mathematical algorithms produce outputs marked with differing degrees of potential threat. This enables users of the system to rank alerts in a rigorous manner, and prioritize those which most urgently require action. Meanwhile, it also assists to avoid the problem of numerous false positives associated with simply a rule-based approach.

More on the Operation of the Cyber Security Appliance 100

As discussed in more detail below, the analyzer module can cooperate with the one or more unsupervised machine learning models trained on the normal pattern of life in order to perform anomaly detection against the actual normal pattern of life/normal behavior for that system to determine whether an anomaly (e.g., the identified abnormal behavior and/or suspicious activity) is malicious or benign. In the operation of the cyber security appliance 100, the potential cyber threat can be previously unknown but shares enough (or does not share enough) in common with the traits from the AI models trained on cyber threats to now be identified as malicious or benign. Note, if later confirmed as malicious, then the AI models trained with machine learning on possible cyber threats can update their training. Likewise, as the cyber security appliance 100 continues to operate, then the one or more machine learning models trained on a normal pattern of life for each of the entities in the system can be updated and trained with unsupervised machine learning algorithms. The analyzer module can use any number of data analysis processes (discussed more in detail below and including the agent analyzer data analysis process here) to help obtain system data points so that this data can be fed and compared to the one or more machine learning models trained on a normal pattern of life, as well as the one or more machine learning models trained on potential cyber threats, as well as create and store data points with the connection fingerprints.

All of the above AI models can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly Detection/Deviations

Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are tons of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

Again, the AI models trained on a normal behavior of entities in a network under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, during pre-deployment the cyber threat analyst module and the analyzer module can use data analysis processes and cooperate with AI models trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI models trained on a normal behavior of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both email and IT network domains under analysis. Thus, email and IT network raw sources of data can be examined along with a large number of derived metrics that each produce time series data for the given metric.

A Little More on the Modules' Interactions

The gatherer module cooperates with a data store. The data store stores comprehensive logs for network traffic observed. These logs can be filtered with complex logical queries and each IP packet can be interrogated on a vast number of metrics in the network information stored in the data store. Similarly, other domain's communications and data, such as emails, logs, etc. may be collected and stored in the data store. The gatherer module may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gatherer module for each possible hypothesis.

The data store can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The data gather module may have a process identifier classifier. The process identifier classifier can identify and track each process and device in the network, under analysis, making communication connections. A data store cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the domains under analysis may be collected and compared.

Examples of domains/networks being protected can include any of i) an Informational Technology network, ii) an Operational Technology network, iii) a Cloud service, iv) a SaaS service, v) an endpoint device, vi) an email domain, and vii) any combinations of these. A domain module is constructed and coded to interact with and understand a specific domain. A first domain module can be an IT network module configured to receive information from and send information to, in this example, IT network-based sensors (i.e., probes, taps, etc.). The first domain module also has algorithms and components configured to understand, in this example, IT network parameters, IT network protocols, IT network activity, and other IT network characteristics of the network under analysis. A second domain module is, in this example, an email module. A second domain module can be an email network module configured to receive information from and send information to, in this example, email-based sensors (i.e., probes, taps, etc.). The second domain module also has algorithms and components configured to understand, in this example, email parameters, email protocols and formats, email activity, and other email characteristics of the network under analysis. Additional domain modules can also collect domain data from another respective domain. The coordinator module is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier in the data gather module can cooperate with additional classifiers in each of the domain modules to assist in tracking individual processes and associating them with entities in a domain under analysis as well as individual processes and how they relate to each other. The process identifier classifier can cooperate with other trained AI classifiers in the modules to supply useful metadata along with helping to make logical nexuses.

A feedback loop of cooperation exists between the gatherer module, the analyser module, one or more models trained on different aspects of this process, and the cyber threat analyst module to gather information to determine whether a cyber threat is potentially attacking the networks/domains under analysis.

Determination of Whether Something is Likely Malicious

In the following examples the analyzer module and/or cyber threat analyst module can use multiple factors to the determination of whether a process, event, object, entity, etc. is likely malicious.

In an example, the analyser module and/or cyber threat analyst module can cooperate with the Artificial Intelligence models trained on potential email cyber threats to detect whether the anomalous activity detected, such as suspicious emails, exhibits traits that may suggest a malicious intent, such as phishing links, scam language, sent from suspicious domains, etc. The analyser module and/or cyber threat analyst module can also cooperate with the Artificial Intelligence models trained on potential IT-based cyber threats to detect whether the anomalous activity detected, such as suspicious IT links, URLs, domains, user activity, etc., may suggest a malicious intent as indicated by the Artificial Intelligence models trained on potential IT-based cyber threats.

In the above example, the analyser module and/or cyber threat analyst module can cooperate with the one or more Artificial Intelligence models trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyser module and/or cyber threat analyst module can cooperate with the one or more Artificial Intelligence models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module and/or cyber threat analyst module can be configured with one or more data analysis processes to cooperate with the one or more AI models trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module and/or cyber threat analyst module can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models trained on potential cyber threats and/or the AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more AI models trained with machine learning on the pattern of life of each device and its associated processes in the system. Next, the analyzer module and/or cyber threat analyst module can have an external input to ingest threat intelligence from other devices in the network cooperating with the cyber security appliance 100. Next, the analyzer module and/or cyber threat analyst module can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analysis module and/or cyber threat analyst module can combine these Indicators of Compromise (e.g. unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features looked at. A deeper analysis of endpoint data can include things like the domain metadata itself that can reveal peculiarities and as such one or more indicators of potentially a malicious domain, such as its URL, then this could help confirm an analysis to determine that indeed a cyber threat has been detected. The analysis module can also look at factors of how rare the endpoint connection is, how old the endpoint is, where geographically the endpoint is located, how a security certificate associated with a communication is verified only by an endpoint device or by an external 3rd party, just to name a few additional factors. The analysis module (and similarly the cyber threat analyst module) can then assign weighting given to these factors in the machine learning that can be supervised based on how strongly that characteristic has been found to match up to actual malicious sites in the training.

In another AI classifier to find potentially malicious indicators, the agent analyzer data analysis process in the analyzer module and/or cyber threat analyst module may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyzer module cyber threat analyst module may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module can use the agent analyzer data analysis process and the AI models trained on forming and investigating hypotheses on what are a possible set of cyber threats to use the machine learning and/or set scripts to aid in forming one or more hypotheses to support or refute each hypothesis. The cyber threat analyst module can cooperate with the AI models trained on forming and investigating hypotheses to form an initial set of possible hypotheses, which needs to be intelligently filtered down.

The cyber threat analyst module can be configured to use the one or more supervised machine learning models trained on
- agnostic examples of a past history of detection of a multitude of possible types of cyber threat hypotheses previously analyzed by human, who was a cyber security professional,
- a behavior and input of how a plurality of human cyber security analysts make a decision and analyze a risk level regarding and a probability of a potential cyber threat,
- steps to take to conduct an investigation start with anomaly via learning how expert humans tackle investigations into specific real and synthesized cyber threats and then the steps taken by the human cyber security professional to narrow down and identify a potential cyber threat, and
- what type of data and metrics that were helpful to further support or refute each of the types of cyber threats, in order to determine a likelihood of whether the abnormal behavior and/or suspicious activity is either i) malicious or ii) benign?

The cyber threat analyst module using AI models, scripts and/or rules-based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioural pattern analysis of what are the unusual behaviours of the network/system/device/user under analysis by the machine learning models may be as follows. The coordinator module can tie the alerts, activities, and events from, in this example, the email domain to the alerts, activities, and events from the IT network domain. FIG. 16 illustrates a graph 220 of an embodiment of an example chain of unusual behaviour for, in this example, the email activities and IT network activities deviating from a normal pattern of life in connection with the rest of the system/network under analysis. The cyber threat analyst module and/or analyzer module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behaviour of a malicious actor-human, program, or other threat. The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. Again, the cyber security appliance 100 can go back and pull in some of the normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. The cyber threat analyst module can put data and entities into 1) a directed graph and nodes in that graph that are overlapping or close in distance have a good possibility of being related in some manner, 2) a vector diagram, 3) a relational database, and 4) other relational techniques that will at least be examined to assist in creating the chain of related activity connected by causal links, such as similar time, similar entity and/or type of entity involved, similar activity, etc., under analysis. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviours under analysis, that are equal to or above a configurable level of threat posed by this malicious actor.

The autonomous response engine of the cyber security system is configured to take one or more autonomous mitigation actions to mitigate the cyber threat during the cyberattack by the cyber threat. The autonomous response engine is configured to reference an Artificial Intelligence model trained to track a normal pattern of life for each node of the protected system to perform an autonomous act of restricting a potentially compromised node having i) an actual indication of compromise and/or ii) merely adjacent to a known compromised node, to merely take actions that are within that node's normal pattern of life to mitigate the cyber threat. Similarly named components in the cyber security restoration engine can operate and function similar to as described for the detection engine.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

An Assessment of the Cyber Threat in Order to Determine Appropriate Autonomous Actions, for Example, Those by the Autonomous Response Engine In the next step, the analyzer module and/or cyber threat analyst module generates one or more supported possible cyber threat hypotheses from the possible set of cyber threat hypotheses. The analyzer module generates the supporting data and details of why each individual hypothesis is supported or not. The analyzer module can also generate one or more possible cyber threat hypotheses and the supporting data and details of why they were refuted.

In general, the analyzer module cooperates with the following three sources. The analyzer module cooperates with the AI models trained on cyber threats to determine whether an anomaly such as the abnormal behavior and/or suspicious activity is either 1) malicious or 2) benign when the potential cyber threat under analysis is previously unknown to the cyber security appliance 100. The analyzer module cooperates with the AI models trained on a normal behavior of entities in the network under analysis. The analyzer module cooperates with various AI-trained classifiers. With all of these sources, when they input information that indicates a potential cyber threat that is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, an assessment module with the AI classifiers is configured to cooperate with the analyzer module. The analyzer module supplies the identity of the supported possible cyber threat hypotheses from the possible set of cyber threat hypotheses to the assessment module. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order to assign a numerical assessment of a given cyber threat hypothesis that was found likely to be supported by the analyzer module with the one or more data analysis processes, via the abnormal behavior, the suspicious activity, or the collection of system data points. The assessment module with the AI classifiers output can be a score (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the analyzer module, which includes the abnormal behavior or suspicious activity as well as one or more of the collection of system data points, with the one or more AI models trained on possible cyber threats.

The cyber threat analyst module in the AI-based cyber security appliance 100 component provides an advantage over competitors' products as it reduces the time taken for cybersecurity investigations, provides an alternative to manpower for small organizations and improves detection (and remediation) capabilities within the cyber security platform.

The AI-based cyber threat analyst module performs its own computation of threat and identifies interesting network events with one or more processors. These methods of detection and identification of threat all add to the above capabilities that make the AI-based cyber threat analyst module a desirable part of the cyber security appliance 100. The AI-based cyber threat analyst module offers a method of prioritizing which is not just a summary or highest score alert of an event evaluated by itself equals the most bad, and prevents more complex attacks being missed because their composite parts/individual threats only produced low-level alerts.

The AI classifiers can be part of the assessment component, which scores the outputs of the analyzer module. Again as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module can generate an output such as a printed or electronic report with the relevant data. The formatting module can cooperate with both the analyzer module and the assessment module depending on what the user wants to be reported.

The formatting module is configured to format, present a rank for, and output one or more supported possible cyber threat hypotheses from the assessment module into a formalized report, from one or more report templates populated with the data for that incident.

The formatting module is configured to format, present a rank for, and output one or more detected cyber threats from the analyzer module or from the assessment module into a formalized report, from one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three. The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat. The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with the knowledge that malicious activity is likely occurring/is associated with a given process from the analyzer module, then cooperates with the autonomous response engine to take an autonomous action such as i) deny access in or out of the device or the network and/or ii) shutdown activities involving a detected malicious agent.

The autonomous response engine, rather than a human taking an action, can be configured to cause one or more rapid autonomous mitigation actions to be taken to counter the cyber threat. A user interface for the response module can program the autonomous response engine i) to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response engine will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response engine uses one or more Artificial Intelligence models that are configured to intelligently work with other third-party defense systems in that customer's network against threats. The autonomous response engine can send its own protocol commands to devices and/or take actions on its own. In addition, the autonomous response engine uses the one or more Artificial Intelligence models to orchestrate with other third-party defense systems to create a unified defense response against a detected threat within or external to that customer's network. The autonomous response engine can be an autonomous self-learning response coordinator that is trained specifically to control and reconfigure the actions of traditional legacy computer defenses (e.g. firewalls, switches, proxy servers, etc.) to contain threats propagated by, or enabled by, networks and the internet. The cyber threat module can cooperate with the autonomous response engine to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module, analyzer module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

FIG. 9 to FIG. 14 illustrate diagrams of an embodiment of an intelligent orchestration module facilitating an example of an Artificial Intelligence augmented and adaptive interactive response loop between the four Artificial Intelligence-based engines. Again, the multiple (e.g. four) Artificial Intelligence-based engines have communication hooks in between them to exchange a significant amount of behavioral metrics including data between the multiple Artificial Intelligence-based engines to work together to provide an overall cyber threat response. The AI adaptive incident response loop has interaction and orchestration between the multiple (four) self-learning AI components, each trained and focused on their individual machine-learned tasks of i) detecting a cyber threat, ii) how to conduct a simulation and make the prediction about a cyberattack, iii) how to make and what types of autonomous mitigation responses can be made in response to a cyberattack and iv) what level of restrictions are needed and how to invoke restoration actions to restore nodes in the system being protected while still mitigating effects of the cyberattack. The Artificial Intelligence in each of the engines trained and focused on performing their corresponding machine-learned tasks as well as the orchestration between the Artificial Intelligence-based engines drive the exchange to make them work together against a cyberattack by the cyber threat (e.g. malicious actor). The intelligent orchestration module facilitates the multiple example stages of the Artificial Intelligence augmented and adaptive interactive response loop between these four Artificial Intelligence-based engines.

Figure 9:
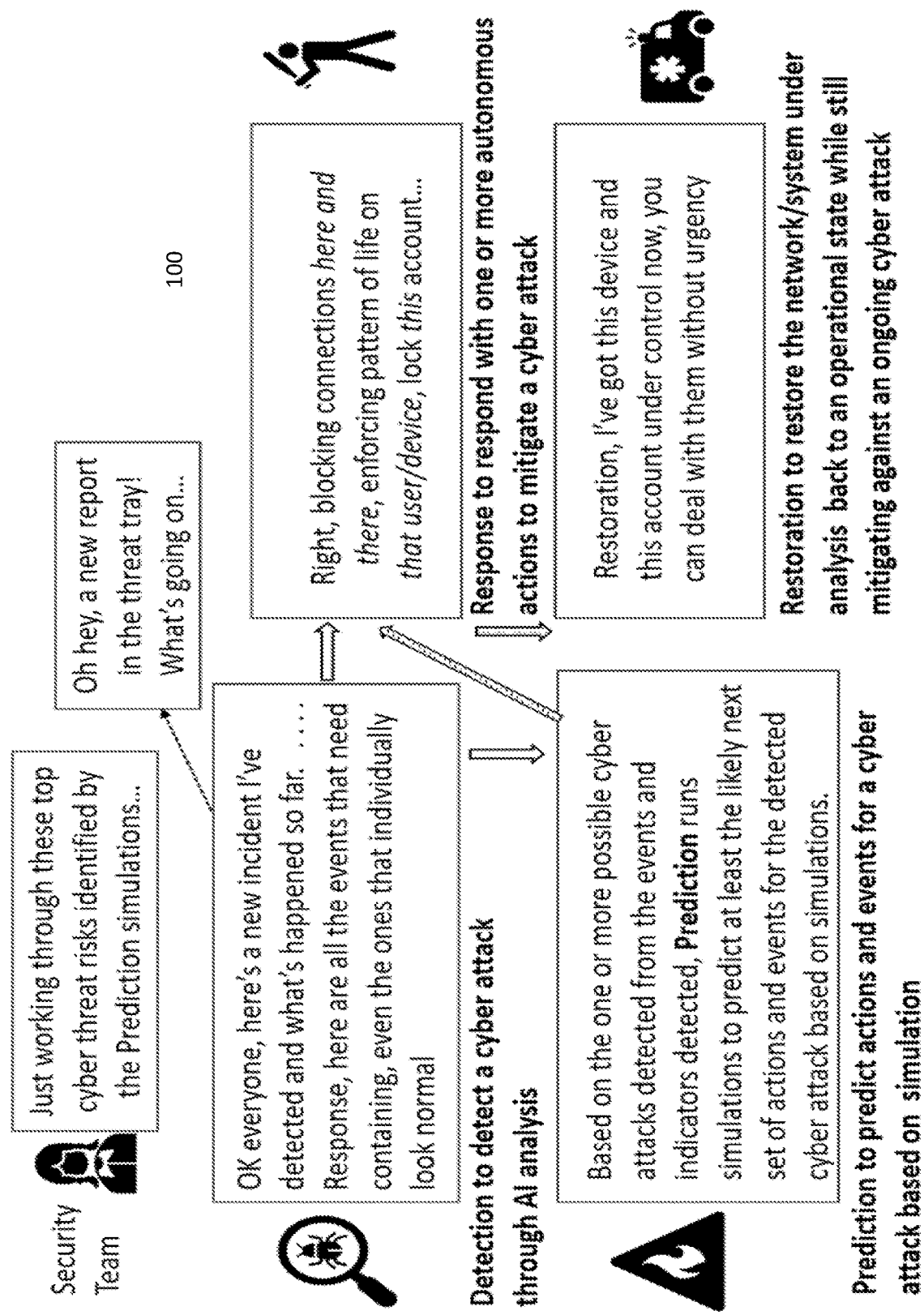

FIG. 9 illustrates a diagram of an example first stage of the interactive Artificial Intelligence-based response loop between the multiple Artificial Intelligence-based engines working in tandem to provide an overall cyber threat response.

The human security team is working through these top cyber threat risks identified by the prediction engine simulations, while the AI detection engine looks for cyber threats.

The detection engine monitoring the example network being protected detects a potential cyber threat. The detection engine informs all the other engines of the new detection and details (e.g. the symptoms detected and any devices possibly compromised). The detection engine also sends a report to the human security team to review.

The detection engine detects a cyberattack through AI analysis and communicates the cyber threat and one or more nodes (user accounts, devices, etc.) showing anomalous behavior indicative of being compromised by the cyber threat to the autonomous response engine. The detection engine communicates to the autonomous response engine about all the cyber events and indicated nodes that need containing, even the ones that potentially individually seem normal.

The autonomous response engine reviews the information from the detection engine to take one or more autonomous actions to mitigate the cyberattack. The artificial intelligence in the autonomous response engine determines what additional information the autonomous response engine needs to take the one or more autonomous actions to mitigate the cyberattack while still minimizing an effect on the rest of the non-compromised nodes in the system and other mitigation actions needed to contain the cyber threat. The autonomous response engine reasons and acts, e.g. blocking specific network connections, enforcing a pattern of life on users/devices, and locking accounts. The autonomous response engine is trained to mitigate the cyber threat and compromised nodes with the minimum number of changes to achieve that goal, and with a minimum disruption to legitimate on-going operations.

The detection engine detects a cyberattack through AI analysis and also communicates the cyber threat and one or more nodes (user accounts, devices, etc.) showing anomalous behavior indicative of being compromised by the cyber threat to the prediction engine. The prediction engine reviews the information and runs one or more Artificial Intelligence-based simulations of cyberattacks to assist in determining 1) how this cyberattack might have occurred in the system being protected, and 2) using the cyberattack information from the detection engine to run simulations to preempt possible escalations of this ongoing actual cyberattack. The prediction engine reviews the information from the detection engine and the artificial intelligence in the prediction engine determines what additional information the prediction engine needs to run one or more simulations of this cyberattack. The prediction engine reasons, based on the one or more possible cyberattacks detected from the events and indicators detected, the likely next set of actions that might take place in the attack-especially the actions that would constitute the most dangerous escalations.

The prediction engine communicates with the autonomous response engine to supplement the actions and events it can take to mitigate the cyberattack based on the simulations. Again, the autonomous response engine reasons and acts.

The autonomous response engine communicates with the restoration engine what autonomous actions have been taken to mitigate the cyber threat. The autonomous response engine communicates e.g. that a specific device and account are being contained now, and restoration is therefore less urgent. The restoration engine pulls information from the detection engine to determine an operational state for each node in the system being protected. The artificial intelligence in the restoration engine analyzes the operational state of the nodes in the network/system being protected. The artificial intelligence in the restoration engine analyzes the operational state of the nodes and what level of mitigation might be needed to contain the cyber threat during this ongoing cyberattack. The artificial intelligence in the restoration engine also analyzes the information from the Artificial Intelligence-based simulations of cyberattacks to assist in determining what level of restrictions are needed on the potentially compromised nodes and their neighboring nodes to still mitigate against an ongoing cyberattack but minimize an effect on the rest of the system.

Figure 10:
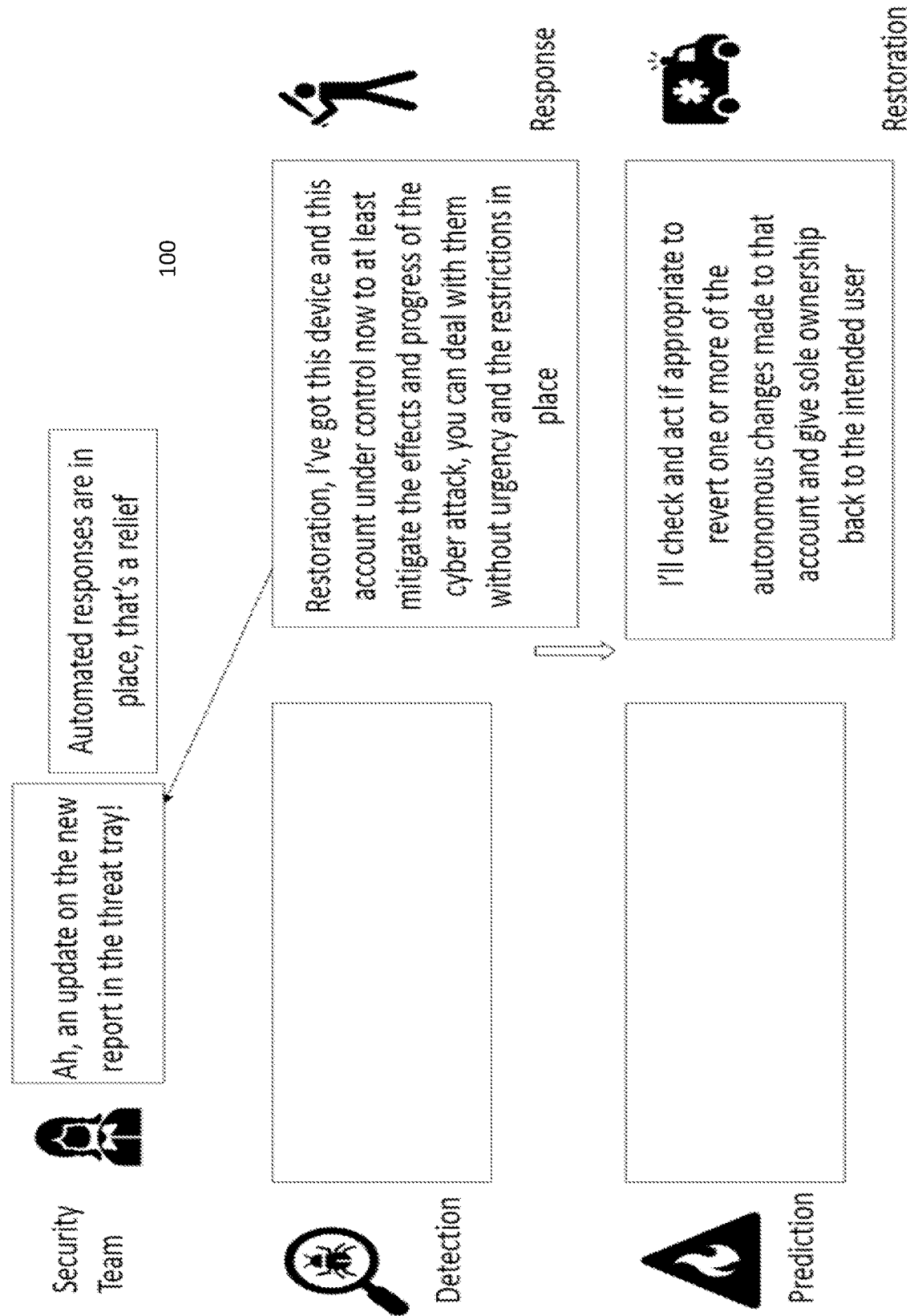

FIG. 10 illustrates a diagram of an example second stage of the interactive Artificial Intelligence-based response loop between the multiple Artificial Intelligence-based engines working in tandem to provide an overall cyber threat response. Again, the autonomous response engine communicates with the human cyber security team and restoration engine about the things it has successfully contained. The human cyber security team does not need to have been involved at all to this point. The restoration engine also communicates to the human cyber security team a report. The restoration engine is configured to be able to take autonomous recovery actions in some cases such as this one, and can autonomously e.g. revert one or more of the changes made to an account and give sole ownership back to the intended user.

The cyber security restoration engine is trained to heal the protected system back to a healthy state with the minimum number of changes to achieve that goal, and with a minimum disruption to legitimate on-going operations. The cyber security restoration engine can take various example remediation actions in real time. The cyber security restoration engine to restore the protected system can use historic SaaS/IaaS resource access, privilege information and clustered similar users to reset user access and permissions after a privilege escalation incident.

Figure 11:
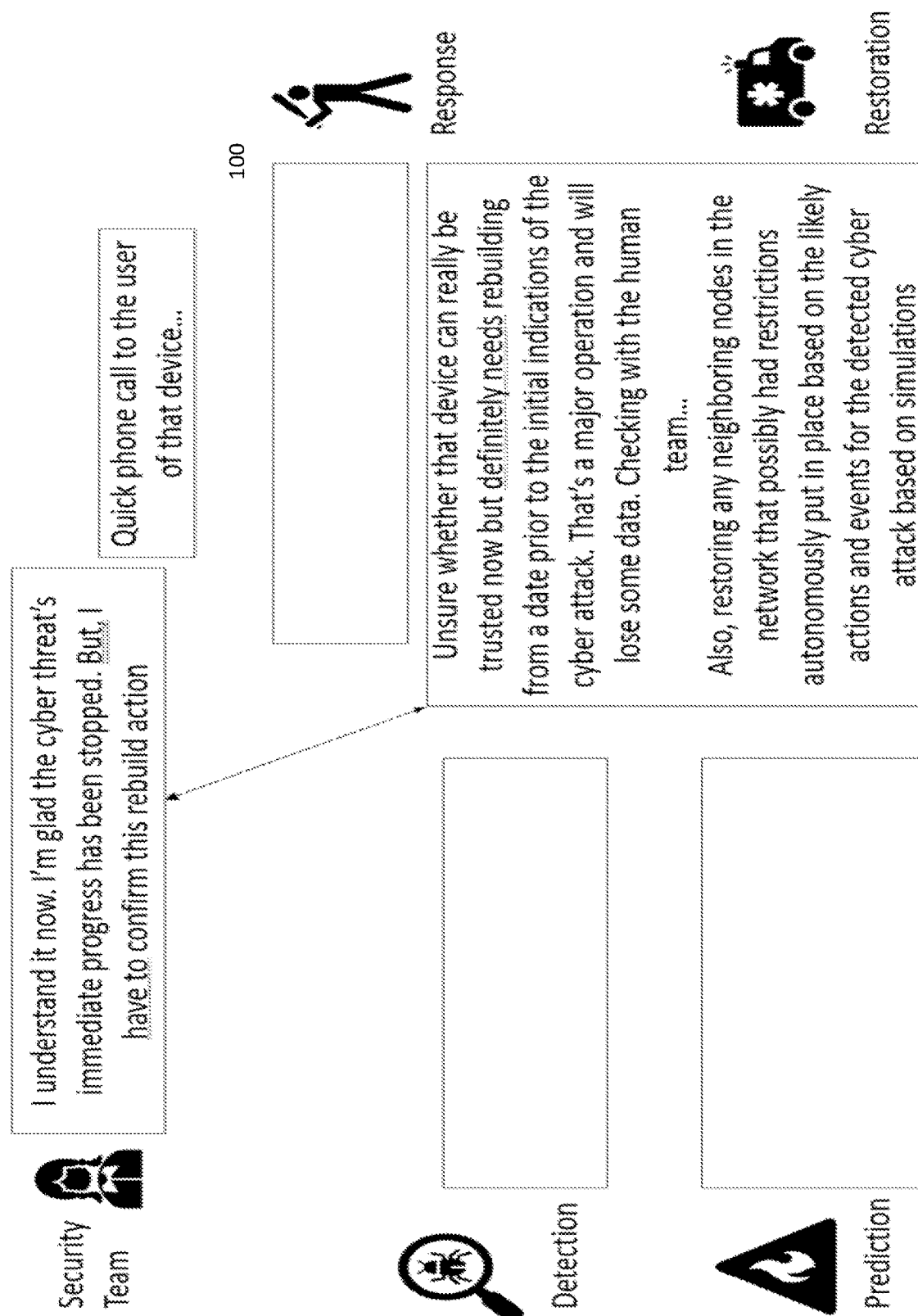

FIG. 11 illustrates a diagram of an example third stage of the interactive Artificial Intelligence-based response loop between the multiple Artificial Intelligence-based engines working in tandem to provide an overall cyber threat response. The restoration engine sends another report after its analysis to the human cyber security team. The report communicates that it cannot be sure whether an initially compromised device can be trusted now and it recommends rebuilding from an effective date prior to the initial indications of the cyberattack. This a major operation and the device and its user will lose some data. The cyber-security restoration engine checks with the human team to obtain approval to perform this restoration action. The human cyber security team decide whether to confirm this rebuild action, potentially including in that decision information that cannot be known by the cyber security system (e.g. calling a device's user to discuss the impact of the rebuild). The restoration engine enables human security teams to make quick and confident decisions with the goal of keeping the business up and running. The report can identify assets affected by a cyberattack, their condition, and how best to restore them during and after an attack.

Next, a period of time has occurred between the initial detection of the cyber threat.

Figure 12:
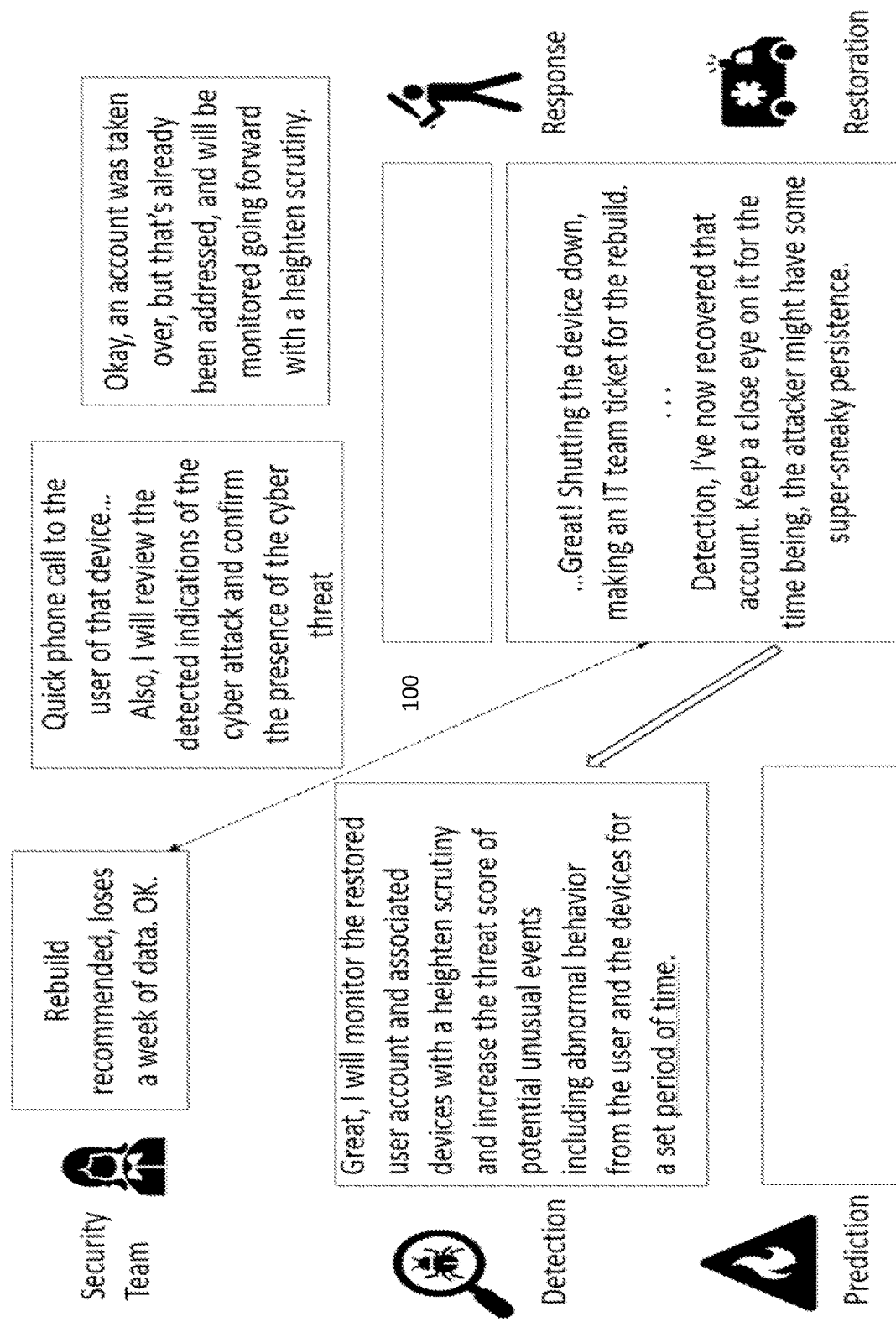

FIG. 12 illustrates a diagram of an example fourth stage of the interactive Artificial Intelligence-based response loop between the multiple Artificial Intelligence-based engines working in tandem to provide an overall cyber threat response. The human security team confirms the recommended device rebuild. The restoration engine communicates back to the detection engine and the human cyber security team after it has automatically recovered an affected account. The detection engine reviews the information from the restoration engine and can choose to enhance the monitoring of this account temporarily, since its recent attack makes it more likely to be attacked again or for new activity to reveal the restoration did not fully resolve the problem. The artificial intelligence in the detection engine determines what additional information the detection engine needs to set the appropriate revised thresholds and types of behavior to look for. The detection engine communicates to both the restoration engine and the human cyber security team that it will monitor the restored user account and associated devices with a heightened scrutiny and increase the threat score of potential unusual events including abnormal behavior from the user and the devices for a set period of time. The detection engine then sets detection of cyber threats and abnormal behavior with the lower thresholds on the specific user account and the associated devices for that set period of time. The prediction engine through its simulations can inform the detection engine and restoration engine whether a recovered device is still extremely weak to other types of cyberattack.

Figure 13:
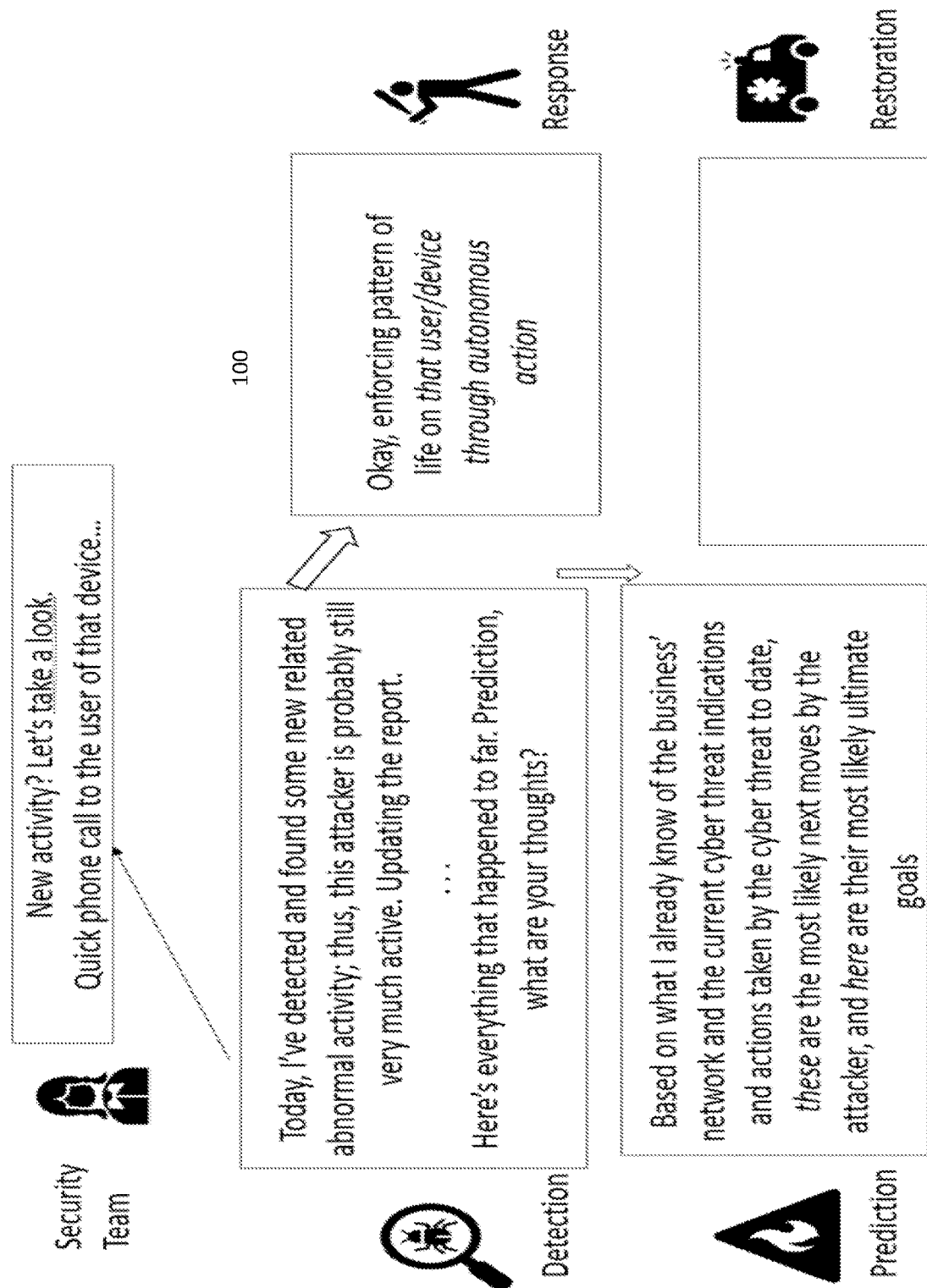

FIG. 13 illustrates a diagram of an example fifth stage of the interactive Artificial Intelligence-based response loop between the multiple Artificial Intelligence-based engines working in tandem to provide an overall cyber threat response. The detection engine sends a new communication to the autonomous response engine and the human security team that it has detected and found some new related abnormal activity; thus, this attacker is probably still active. The autonomous response engine immediately takes actions as before.

The detection engine communicates the new and overall cyber threat activity to the prediction engine. The Artificial Intelligence in the prediction engine reviews the communicated cyber threat activity and gathers additional information to run simulations. The Artificial Intelligence in the prediction engine reasons the most likely and/or most dangerous next moves by the attacker, and their most likely ultimate goals based on the results of the cyberattack simulations.

The human cyber security team reviews the updated report from the detection engine. The human team is active and occasionally needs to confirm recommendations or make decisions, but a large part of the overall incident response is assisted by the AI engines working together without human input.

Figure 14:
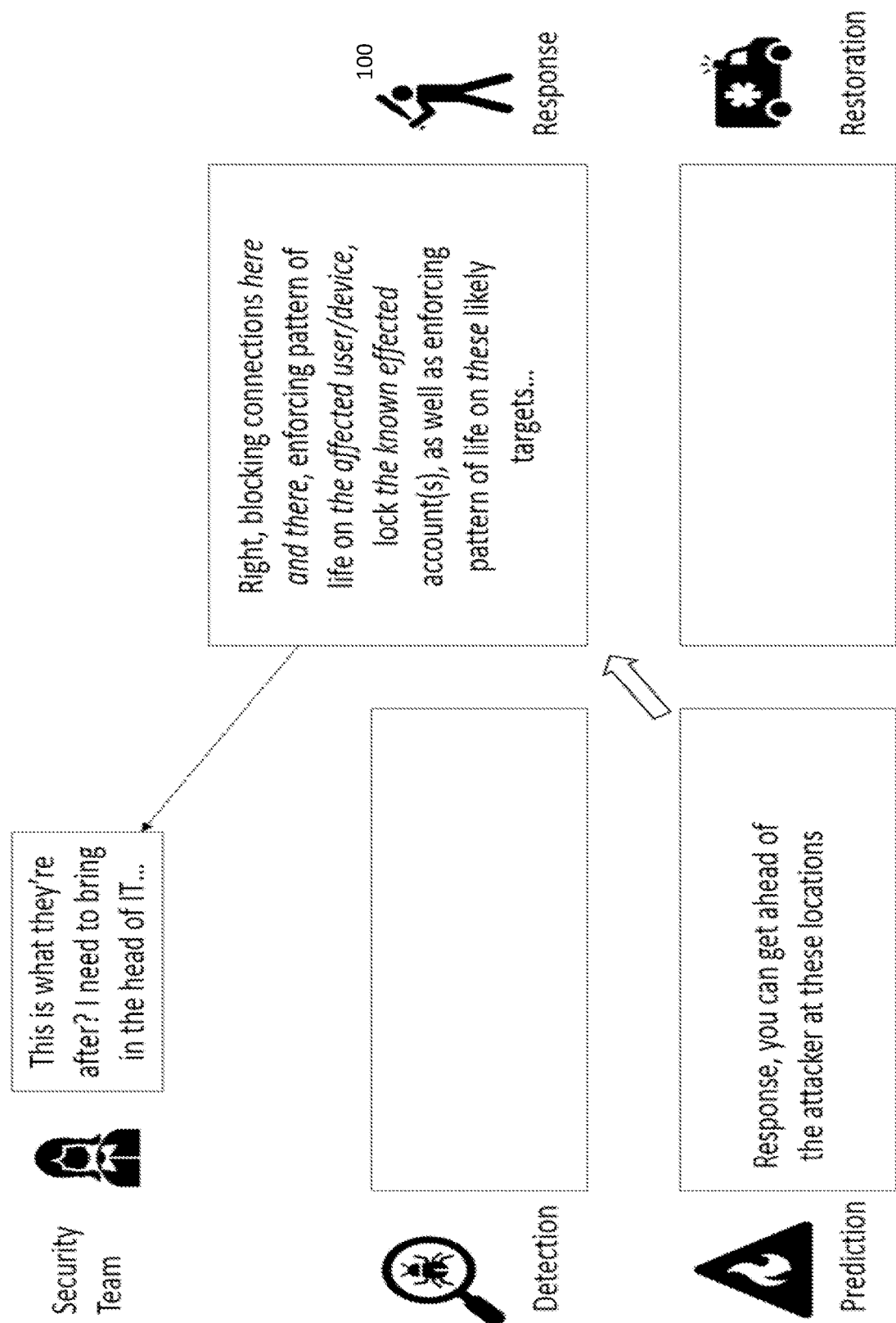

FIG. 14 illustrates a diagram of an example sixth stage of the interactive Artificial Intelligence-based response loop between the multiple Artificial Intelligence-based engines working in tandem to provide an overall cyber threat response. The prediction engine after running the Artificial Intelligence-based simulations communicates to the autonomous response engine the locations where it could block the likely and/dangerous next moves by the attacker. The Artificial Intelligence in the autonomous response engine analyzes the simulation results and grabs any additional information needed to decide what nodes need autonomous actions and what mitigation actions to take to each node that is compromised and potentially its neighboring nodes. The Artificial Intelligence in the autonomous response engine reasons and takes action. The AI engines also update the report visible to the human cyber security team.

This interactive Artificial Intelligence-based response loop between the multiple Artificial Intelligence-based engines working together continues on. The intelligent orchestration module uses unsupervised machine learning algorithms to self-learn from previous cyber threat incidents (and their aftermath) on tasks such as how the response went, what worked, what did not, how long things took and how this compared to previous occasions and to expectations, and then uses this information to adjust future incident response expectations and priorities. The intelligent orchestration module can use action success/completion and time taken as measures of improvement. Likewise, the restoration engine can use unsupervised machine learning algorithms to self-learn from previous cyber threat incidents to get better at healing the system being protected to mitigate the cyber threat while minimizing an impact on the system being protected. Likewise, the cyber security restoration engine can use one or more unsupervised machine learning algorithms, as a self-learning entity, to have an ability to learn how to restore the one or more nodes in the graph of the protected system back to the trusted operational state while still mitigating against the cyber threat so the cyber security restoration engine gets better over time of a deployment of the cyber security restoration engine by learning from previous restoration attempts (e.g. action success/completion and time taken as measures, action effectiveness as a measure, etc., as well as including or adapting changes to previous recommendations made by the human security team.

The cyber threat detection engine, the autonomous response engine, the prediction engine all perform their machine-learned task and send inputs to each other to assist in determining what nodes are impacted, what cyber threat is causing the problems, and how the cyberattack likely occurred and will progress based upon possible mitigation and restoration actions taken so that the restoration engine can rely on the determinations by the Artificial Intelligence in those AI-based engines to give the restoration engine a fantastic starting point for figuring out what is the system being protected is trying to recover from and then a best way to restore the nodes in the system.

There are four discrete AI-based engines working to achieve aims with their own machine learning approaches. Each separate AI contributes data that has been processed intelligently through machine learning approaches and then hands over the processed behavioral metrics to another AI engine which then performs its own individualized machine-learned task.

The prevent engine in conducting simulations can use AI Analyst with external data input (e.g., crowdstrike) and cooperate with the detection engine to identify an infected patient zero and additional devices actually compromised and/or directly linked to devices actually compromised in need of remediation. The linked devices or the activity may not be directly visible to the detection engine alone and the external data input fills in the big picture. The cyber security restoration engine to restore the protected system can potentially use the external data input that the system is receiving from third party integrations (e.g., from host-based agents from 3rd party vendors, antivirus and—based testing antivirus, etc. to identify patient zero of the attack, identify, where the attack has happened and is happening, identify devices that the system reasonably believes are linked to the compromised entity, and recommend remediation or perform remediation via AI alone, and/or AI in combination with human assistance. The cyber security restoration engine can restore the protected system back to a state before a compromise (e.g. abnormalities started) by a cyber threat occurred to the protected system. The cyber security restoration engine restores nodes in the protected system to cyberattacks in progress-so heals in real time, as an attack happens, as well as can assist in healing after an attack has taken place.

The trusted operational state of a node can be an operational state for a date and time before the earliest detection of a possible compromise of a node in the graph (device and/or user account) plus a threshold buffer amount of time.

In an example, the detection engine can use historic IaaS data on virtual resource usage to identify errant virtual resources and the autonomous response engine to spin down those resources or disable overactive microservices like lambdas. In another example, the detection engine can use historic IaaS data on virtual resource usage to understand when a client is undergoing some kind of DDOS and the autonomous response engine acts to do scaling to handle the load until the overload is over. The restoration engine can recommend controlling the scaling when the system understands deliberate overloading of traffic is occurring and then bringing that scaling back down again to assist their service architectures to deal with situations when some cyber threat is trying to overload those systems to bring that customer down.

In another example, the cyber security restoration engine to restore the protected system can use historic source codebase information and modelling from the AI models in the detection engine for development to revert commits and code changes that potentially introduce bad or compromised code. The cyber security restoration engine to restore the protected system can also use historic records of a source code database information to find out when during the development of a product that the cyber-attack occurred on the source code in order to restore the source code back to the state before the compromise occurred, as well as use historic code base analysis and understanding to identify supply chain and products vulnerable to bad code/compromised code and sending an update package/at least a notice to revert those products and further prevent the source code vulnerabilities from trickling down the supply chains from the vendor to the end user. Once file data of a cyber threat is identified, then that file data and its characteristics are captured in an inoculation package and then cascade that file information to each cyber security appliance in the fleet of cyber security appliances, and quarantine the identical and very similar files in order to remove them from all of the environments before anything can spread even more than it has via immediate remediation and also using the system's own inoculation data.

In an example, the autonomous response engine can stop a device that is infected from connecting to other nodes. In addition, the autonomous response engine can restrict reading and writing traffic and/or types of data/information being communicated in that traffic to restrict traffic movement and process activity to nodes close to an entity that the system thinks is performing erroneously or infected.

Referring to FIG. 4, the autonomous response engine is configured to use one or more Application Programming Interfaces to translate desired mitigation actions for nodes (devices, user accounts, etc.) into a specific language and syntax utilized by that device, user account, etc. from potentially multiple different vendors being protected in order to send the commands and other information to cause the desired mitigation actions to change, for example, a behavior of a detected threat of a user and/or a device acting abnormal to the normal pattern of life. The selected mitigation actions on the selected nodes minimize an impact on other parts of the system being protected (e.g. devices and users) that are i) currently active in the system being protected and ii) that are not in breach of being outside the normal behavior benchmark. The autonomous response engine can have a discovery module to i) discover capabilities of each node being protected device and the other cyber security devices (e.g. firewalls) in the system being protected and ii) discover mitigation actions they can take to counter and/or contain the detected threat to the system being protected, as well as iii) discover the communications needed to initiate those mitigation actions.

For example, the autonomous response engine cooperates and coordinates with an example set of network capabilities of various network devices. The network devices may have various capabilities such as identity management including setting user permissions, network security controls, firewalls denying or granting access to various ports, encryption capabilities, centralize logging, antivirus anti-malware software quarantine and immunization, patch management, etc., and also freeze any similar, for example, network activity, etc. triggering the harmful activity on the system being protected.

Accordingly, the autonomous response engine will take an autonomous mitigation action to, for example, shutdown the device or user account, block login failures, perform file modifications, block network connections, restrict the transmission of certain types of data, restrict a data transmission rate, remove or restrict user permissions, etc. The autonomous response engine for an email system could initiate example mitigation actions to either remedy or neutralize the tracking link, when determined to be the suspicious covert tracking link, while not stopping every email entering the email domain with a tracking link, or hold the email communication entirely if the covert tracking link is highly suspicious, and also freeze any similar, for example, email activity triggering the harmful activity on the system being protected.

The autonomous response engine has a default set of autonomous mitigation actions shown on its user interface that it knows how to perform when the different types of cyber threats are equal to or above a user configurable threshold posed by this type of cyber threat. The autonomous response engine is also configurable in its user interface to allow the user to augment and change what type of automatic mitigation actions, if any, the autonomous response engine may take when different types of cyber threats that are equal to or above the configurable level of threat posed by a cyber threat.

The autonomous response engine can also reference its artificial intelligence trained to perform mitigation actions. Again, the autonomous response engine has an administrative tool in its user interface to program/set what autonomous mitigation actions the autonomous response engine can take, including types of mitigation actions and specific mitigation actions the autonomous response engine is capable of, when the cyber-threat module in the detection engine indicates the threat risk parameter is equal to or above the actionable threshold, selectable by the cyber professional. The cyber professional can also indicate what types of mitigation actions can be performed for different users and parts of the system as well as what actions need the cyber professional to approve. Again, the autonomous response engine can also reference a default library of mitigation actions, types of mitigation actions and specific mitigation actions the autonomous response engine is capable of on a particular node.

Referring to FIG. 6, the prediction engine 105 using Artificial Intelligence-based simulations is communicatively coupled to a cyber security appliance 100, an open source (OS) database server 122, an email system 115, one or more endpoint computing devices 101A-B, and an IT network system 112 with one or more entities 130-142, over one or more networks 110/112 in the system being protected.

The prediction engine 105 with Artificial Intelligence-based simulations is configured to integrate with the cyber security appliance 100 and cooperate with components within the cyber security appliance 100 installed and protecting the network from cyber threats by making use of outputs, data collected, and functionality from two or more of a datastore, other modules, and one or more AI models already existing in the cyber security appliance 100.

The prediction engine 105 may include a cyber threat generator module to generate many different types of cyber threats with the past historical attack patterns to attack the simulated system to be generated by the simulated attack module that will digitally/virtually replicate the system being protected, such as a phishing email generator configured to generate one or more automated phishing emails to pentest the email defenses and/or the network defenses provided by the cyber security appliance 100. For example, the system being protected can be an email system and then the phishing email generator may be configured to cooperate with the trained AI models to customize the automated phishing emails based on the identified data points of the organization and its entities.

The email module and network module may use a vulnerability tracking module to track and profile, for example, versions of software and a state of patches and/or updates compared to a latest patch and/or update of the software resident on devices in the system/network. The vulnerability tracking module can supply results of the comparison of the version of software as an actual detected vulnerability for each particular node in the system being protected, which is utilized by the node exposure score generator and the prediction engine 105 with Artificial Intelligence-based simulations in calculating 1) the spread of a cyber threat and 2) a prioritization of remediation actions on a particular node compared to the other network nodes with actual detected vulnerabilities. The node exposure score generator is configured to also factor in whether the particular node is exposed to direct contact by an entity generating the cyber threat (when the threat is controlled from a location external to the system e.g. network) or the particular node is downstream of a node exposed to direct contact by the entity generating the cyber threat external to the network.

The node exposure score generator and the simulated attack module in the prediction engine 105 cooperate to run the one or more hypothetical simulations of an actual detected cyber threat incident and/or a hypothetical cyber-attack incident to calculate the node paths of least resistance in the virtualized instance/modeled instance of the system being protected. The progress through the node path(s) of least resistance through the system being protected are plotted through the various simulated instances of components of the graph of the system being protected until reaching a suspected end goal of the cyber-attack scenario, all based on historic knowledge of connectivity and behavior patterns of users and devices within the system under analysis. The simulated attack module, via a simulator and/or a virtual network clone creator, can be programmed to model and work out the key paths and devices in the system (e.g. a network, with its nets and subnets,) via initially mapping out the system being protected and querying the cyber security appliance on specific's known about the system being protected by the cyber security appliance 100. The simulated attack module is configured to search and query, two or more of i) a data store, ii) modules in the detection engine, and iii) the one or more Artificial Intelligence (AI) models making up the cyber security appliance 100 protecting the actual network under analysis from cyber threats, on what, i) the data store, ii) the modules, and iii) the one or more AI models in the cyber security appliance 100, already know about the nodes of the system, under analysis to create the graph of nodes of the system being protected. Thus, the prediction engine 105 with Artificial Intelligence-based simulations is configured to construct the graph of the virtualized version of the system from knowledge known and stored by modules, a data store, and one or more AI models of a cyber security appliance 100 protecting an actual network under analysis. The knowledge known and stored is obtained at least from ingested traffic from the actual system under analysis. Thus, the virtualized system, and its node components/accounts connecting to the network, being tested during the simulation are up to date and accurate for the time the actual system under analysis is being tested and simulated because the prediction engine 105 with Artificial Intelligence-based simulations is configured to obtain actual network data collected by two or more of 1) modules, 2) a data store, and 3) one or more AI models of a cyber security appliance protecting the actual network under analysis from cyber threats. The simulated attack module will make a model incorporating the actual data of the system through the simulated versions of the nodes making up that system for running simulations on the simulator. Again, a similar approach is taken when the simulated attack module uses a clone creator to spin up and create a virtual clone of the system being protected with virtual machines in the cloud.

The prediction engine 105 with Artificial Intelligence-based simulations is configured to simulate the compromise of a spread of the cyber threat being simulated in the simulated cyber-attack scenario, based on historical and/or similar cyber threat attack patterns, between the devices connected to the virtualized network, via a calculation on an ease of transmission of the cyber threat algorithm, from 1) an originally compromised node by the cyber threat, 2) through to other virtualized/simulated instances of components of the virtualized network, 3) until reaching a suspected end goal of the cyber-attack scenario, including key network devices. The prediction engine 105 with Artificial Intelligence-based simulations also calculates how likely it would be for the cyber-attack to spread to achieve either of 1) a programmable end goal of that cyber-attack scenario set by a user, or 2) set by default an end goal scripted into the selected cyber-attack scenario.

The email module and the network module can include a profile manager module. The profile manager module is configured to maintain a profile tag on all of the devices connecting to the actual system/network under analysis based on their behavior and security characteristics and then supply the profile tag for the devices connecting to the virtualized instance of the system/network when the construction of the graph occurs. The profile manager module is configured to maintain a profile tag for each device before the simulation is carried out; and thus, eliminates a need to search and query for known data about each device being simulated during the simulation. This also assists in running multiple simulations of the cyberattack in parallel.

The prediction engine 105 with Artificial Intelligence-based simulations module is configured to construct the graph of the virtualized system, e.g. a network with its nets and subnets, where two or more of the devices connecting to the virtualized network are assigned with different weighting resistances to malicious compromise from the cyber-attack being simulated in the simulated cyber-attack scenario based on the actual cyber-attack on the virtualized instance of the network and their node vulnerability score. In addition to a weighting resistance to the cyberattack, the calculations in the model for the simulated attack module factor in the knowledge of a layout and connection pattern of each particular network device in a network, an amount of connections and/or hops to other network devices in the network, how important a particular device (a key importance) determined by the function of that network device, the user(s) associated with that network device, and the location of the device within the network. Note, multiple simulations can be conducted in parallel by the orchestration module. The simulations can occur on a periodic regular basis to pentest the cyber security of the system and/or in response to a detected ongoing cyberattack in order to get ahead of the ongoing cyberattack and predict its likely future moves. Again, the graph of the virtualize instance of the system is created with two or more of 1) known characteristics of the network itself, 2) pathway connections between devices on that network, 3) security features and credentials of devices and/or their associated users, and 4) behavioral characteristics of the devices and/or their associated users connecting to that network, which all of this information is obtained from what was already know about the network from the cyber security appliance.

During an ongoing cyberattack, the simulated attack module is configured to run the one or more hypothetical simulations of the detected cyber threat incident and feed details of a detected incident by a cyber threat module in the detection engine into the collections module of the prediction engine 105 using Artificial Intelligence-based simulations. The simulated attack module is configured to run one or more hypothetical simulations of that detected incident in order to predict and assist in the triggering an autonomous response by the autonomous response engine and then restoration by the restoration engine to the detected incident.

The simulated attack module ingests the information for the purposes of modeling and simulating a potential cyber-attacks against the network and routes that an attacker would take through the network. The simulated attack module can construct the graph of nodes with information to i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the system being protected under analysis. Correspondingly, the calculated likelihood of the compromise and timeframes for the spread of the cyberattack is tailored and accurate to each actual device/user account (e.g. node) being simulated in the system because the cyber-attack scenario is based upon security credentials and behavior characteristics from actual traffic data fed to the modules, data store, and AI models of the cyber security appliance.

The prediction engine 105 with its Artificial Intelligence trained on how to conduct and perform cyberattack in a simulation in either a simulator or in a clone creator spinning up virtual instances on virtual machines will take a sequence of actions and then evaluate the actual impact after each action in the sequence, in order to yield a best possible result to contain/mitigate the detected threat while minimizing the impact on other network devices and users that are i) currently active and ii) not in breach, from different possible actions to take. Again, multiple simulations can be run in parallel so that the different sequences of mitigation actions and restoration actions can be evaluated essentially simultaneously. The prediction engine 105 with Artificial Intelligence-based simulations in the prediction engine 105 is configured to use one or more mathematical functions to generate a score and/or likelihood for each of the possible actions and/or sequence of multiple possible actions that can be taken in order to determine which set of actions to choose among many possible actions to initiate. The one or more possible actions to take and their calculated scores can be stacked against each other to factor 1) a likelihood of containing the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then communicate with the cyber threat detection engine, the autonomous response engine, and the cyber-security restoration engine, respectively, to initiate the chosen set of actions to cause a best targeted change of the behavior of the detected threat acting abnormal to the normal pattern of life on the network while minimizing the impact on other network devices and users that are i) currently active and ii) not in breach of being outside the normal behavior benchmark. The prediction engine cooperates with the AI models modelling a normal pattern of life for entities/nodes in the system being protected.

The simulated attack module is programmed itself and can cooperate with the artificial intelligence in the restoration engine to factor an intelligent prioritization of remediation actions and which nodes (e.g. devices and user accounts) in the simulated instance of the system being protected should have a priority compared to other nodes. This can also be reported out to assist in allocating human security team personnel resources that need human or human approval to restore the nodes based on results of the one or more hypothetical simulations of the detected incident.

Note, the prediction engine does not need to not calculate every theoretically possible path from the virtualized instance of the source device to the end goal of the cyber-attack scenario but rather a set of the most likely paths, each time a hop is made from one node in the virtualized network to another device in the virtualized network, in order to reduce an amount of computing cycles needed by the one or more processing units as well as an amount of memory storage needed in the one or more non-transitory storage mediums.

FIG. 8 illustrates a block diagram of an embodiment of the AI-based cyber security appliance 100 with the cyber security restoration engine and other Artificial Intelligence-based engines plugging in as an appliance platform to protect a system. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

FIG. 17 illustrates a diagram of an embodiment of the cyber security restoration engine cooperating with the other Artificial Intelligence-based engines of the cyber security system to track and understand the cyber threat identified by the other Artificial Intelligence-based engines as well as track the one or more mitigation actions taken to mitigate the cyber threat during the cyberattack by the other Artificial Intelligence-based engines in order to assist in intelligently restoring the protected system, while still mitigating the cyber threat attack, back to the trusted operational state before indications of when the compromised started by the cyber threat attack. The Artificial Intelligence-based cyber security system can also use a cyber threat analyst module 104 to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100 with the multiple Artificial Intelligence-based engines is implemented on computer 1. Computer 1 on the first computer system 10 has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in computer 1 builds and maintains a dynamic, ever-changing model of the 'normal behavior' of each user and machine within the system 10. The approach is based on Bayesian mathematics, and monitors all interactions, events, and communications within the system 10—which computer is talking to which, files that have been created, networks that are being accessed.

For example, computer 2 is-based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation and/or autonomous action.

The cyber security appliance 100 is built to deal with the fact that today's attackers are getting stealthier and an attacker/malicious agent may be 'hiding' in a system to ensure that they avoid raising suspicion in an end user, such as by slowing their machine down. The Artificial Intelligence model(s) in the cyber security appliance 100 builds a sophisticated 'pattern of life'—that understands what represents normality for every person, device, and network activity in the system being protected by the cyber security appliance 100.

The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the network by analyzing data on the activity on the network at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised Learning can break down features of what it is analyzing (e.g. a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network-even when it does not know what it is looking for.

The cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature-based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The methods and systems shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD. The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

FIG. 15 illustrates a block diagram of an embodiment of one or more computing devices that can be a part of the Artificial Intelligence-based cyber security system including the multiple Artificial Intelligence-based engines discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software. In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball, or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. A software engine is a core component of a complex system consisting of hardware and software that is capable of performing its function discretely from other portions of the entire complex system but designed to interact with the other portions of the entire complex system.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
a cyber threat detection engine cooperating with one or more Artificial Intelligence models configured to detect a cyber threat incident, where the detection engine is configured to detect anomalous behavior of one or more nodes in a graph of a system being protected,
where the cyber threat detection engine has an anomaly alert system in a formatting module configured to report out anomalous incidents and events as well as the cyber threat detected to a display screen, and
an intelligent orchestration module configured to facilitate an Artificial Intelligence augmented and adaptive interactive response loop between multiple Artificial Intelligence-based engines, where i) the cyber threat detection engine is configured to use Artificial Intelligence algorithms trained to perform a first machine-learned task of detecting the cyber threat, ii) an autonomous response engine configured to use Artificial Intelligence algorithms trained to perform a second machine-learned task of taking one or more mitigation actions to mitigate the cyber threat, and iii) a cyber-security restoration engine configured to use Artificial Intelligence algorithms trained to perform a third machine-learned task of taking one or more remediation actions to one or more nodes of the system being protected back to a trusted operational state, and
where the multiple Artificial Intelligence-based engines have communication hooks in between them to exchange behavioral metrics between the multiple Artificial Intelligence-based engines to work in tandem to provide an overall cyber threat response.

2. The apparatus of claim 1, where the intelligent orchestration module is configured as a discrete intelligent orchestration module that exists on top of the multiple Artificial Intelligence-based engines to orchestrate the overall cyber threat response and an interaction between the multiple Artificial Intelligence-based engines.

3. The apparatus of claim 1, where the intelligent orchestration module is configured as a distributed collaboration with a portion of the intelligent orchestration module implemented in each of the multiple Artificial Intelligence-based engines to orchestrate the overall cyber threat response and an interaction between the multiple Artificial Intelligence-based engines.

4. The apparatus of claim 1, where the multiple Artificial Intelligence-based engines to further include iv) a prediction engine configured to use Artificial Intelligence algorithms trained to perform a fourth machine-learned task of Artificial Intelligence-based simulations of cyberattacks to assist in determining 1) how a simulated cyberattack might occur in the system being protected, and 2) how to use information of the simulated cyberattack to preempt possible escalations of an ongoing actual cyberattack.

5. The apparatus of claim 1, where an autonomous response engine is configured to cooperate with a cyber threat prediction engine and its Artificial Intelligence-based simulations to choose an initial set of one or more mitigation actions indicated as a preferred targeted initial response to a detected cyber threat by autonomously initiating those mitigation actions to defend against the detected cyber threat, rather than a human taking an action, where the autonomous response engine, rather than the human taking the action, is configured to autonomously cause the one or more mitigation actions to be taken to contain the cyber threat when a threat risk parameter from an assessment module in a detection engine is equal to or above an actionable threshold.

6. The apparatus of claim 1, where a cyber threat prediction engine and its Artificial Intelligence-based simulations is configured to cooperate with the cyber-security restoration engine to assist in choosing one or more remediation actions to perform on nodes affected by a cyberattack back to the trusted operational state while still mitigating the cyber threat during the ongoing cyberattack based on effects determined through the Artificial Intelligence-based simulations of possible remediation actions to perform and their effects on the nodes making up the system being protected and preempt possible escalations of the cyberattack while restoring one or more nodes back to their trusted operational state.

7. The apparatus of claim 1, where the multiple Artificial Intelligence-based engines, where each separate Artificial Intelligence-based engine has an interface to communicate with the other separate Artificial Intelligence-based engines configured to understand a type of information and communication that the other separate Artificial Intelligence-based engine needs to make determinations on an ongoing cyberattack from that other Artificial Intelligence-based engine's perspective, where each Artificial Intelligence-based engine has a messaging system to communicate with a human cyber-security team to keep the human cyber-security team informed on actions autonomously taken and actions needing human approval.

8. The apparatus of claim 1, where the multiple Artificial Intelligence-based engines are configured to cooperate to combine an understanding of normal operations of the nodes in the graph of the system, an understanding of emerging cyber threats, an ability to contain those emerging cyber threats, and a restoration of the nodes of the system to heal the system with an adaptive feedback between the multiple Artificial Intelligence-based engines in light of simulations of a cyberattack by the cyber threat to predict what might occur in the nodes in the system based on mitigation actions taken to contain those emerging cyber threats and remediation actions taken to heal the nodes using information from the simulated cyberattack.

9. The apparatus of claim 1, where a cyber threat prediction engine and its Artificial Intelligence-based simulations are configured to simulate how a cyberattack by the cyber threat could possibly have happened, and how the cyberattack might likely progress in a future tailored with an innate understanding of a normal behavior of the nodes in the system being protected and a current operational state of each node in the graph of the protected system during simulations of cyberattacks.

10. An apparatus, comprising:
an intelligent orchestration module configured to facilitate an Artificial Intelligence augmented and adaptive interactive response loop between multiple Artificial Intelligence-based engines, where the multiple Artificial Intelligence-based engines at least include:
a cyber threat detection engine configured with software code, electronic hardware as well as to use Artificial Intelligence algorithms trained to perform a first machine-learned task of detecting a cyber threat based on behavioral metrics associated with one or more nodes in a system being protected,
an autonomous response engine configured with software code, electronic hardware as well as to use Artificial Intelligence algorithms trained to perform a second machine-learned task of taking one or more mitigation actions to mitigate a detected cyber threat,
a cyber-security restoration engine configured with software code, electronic hardware as well as to use Artificial Intelligence algorithms trained to perform a third machine-learned task of taking one or more remediation actions to remediate one or more nodes in the system being protected back to a trusted operational state,
a prediction engine configured with software code, electronic hardware as well as to use Artificial Intelligence algorithms trained to perform a fourth machine-learned task of Artificial Intelligence-based simulations of cyberattacks to assist in determining 1) how a simulated cyberattack might occur in the system being protected, and 2) how to use information from the simulated cyberattack to preempt possible escalations of an ongoing actual cyberattack, and
where the multiple Artificial Intelligence-based engines have communication hooks in between them to bilaterally exchange the behavioral metrics between the multiple Artificial Intelligence-based engines to work together to provide an overall cyber threat response during the ongoing actual cyberattack in light of Artificial Intelligence-based simulations of the cyberattack to predict what might occur in the nodes in the system based on, at least one of, i) the mitigation actions taken and ii) the remediation actions taken, where any software implemented by the intelligent orchestration module and the multiple Artificial Intelligence-based engines is stored in an executable state in one or more non-transitory computer readable mediums to be executed by one or more processors.

11. A method for an interactive Artificial Intelligence-based response loop to a cyberattack, comprising:
configuring a cyber threat detection engine cooperating with one or more Artificial Intelligence models to detect a cyber threat incident, where the detection engine is configured to detect anomalous behavior of one or more nodes in a graph of a system being protected; and thereby, attempt to prevent a cyber threat from compromising the nodes of the system,
configuring the cyber threat detection engine to report out anomalous incidents and events as well as the cyber threat detected to a display screen, and configuring an intelligent orchestration module to facilitate the interactive Artificial Intelligence-based response loop to the cyberattack between multiple Artificial Intelligence-based engines, where i) the cyber threat detection engine is configured to use Artificial Intelligence algorithms trained to perform a first machine-learned task of detecting the cyber threat, ii) an autonomous response engine configured to use Artificial Intelligence algorithms trained to perform a second machine-learned task of taking one or more mitigation actions to mitigate the cyber threat, and iii) a cyber-security restoration engine configured to use Artificial Intelligence algorithms trained to perform a third machine-learned task of remediating the system being protected back to a trusted operational state, and configuring the multiple Artificial Intelligence-based engines to have communication hooks in between them to exchange behavioral metrics between the multiple Artificial Intelligence-based engines to work in tandem to provide an overall cyber threat response.

12. The method of claim 11, comprising:

configuring the intelligent orchestration module to be a discrete intelligent orchestration module that exists on top of the multiple Artificial Intelligence-based engines to orchestrate the overall cyber threat response and an interaction between the multiple Artificial Intelligence-based engines each configured to perform its own machine-learned task.

13. The method of claim 11, comprising:

configuring the intelligent orchestration module to be a distributed collaboration with a portion of the intelligent orchestration module implemented in each of the multiple Artificial Intelligence-based engines to orchestrate the overall cyber threat response and an interaction between the multiple Artificial Intelligence-based engines.

14. The method of claim 11, comprising:

configuring the multiple Artificial Intelligence-based engines to further include iv) a prediction engine configured to use Artificial Intelligence algorithms trained to perform a fourth machine-learned task of Artificial Intelligence-based simulations of cyberattacks to assist in determining 1) how a simulated cyberattack might occur in the system being protected, and 2) how to use information from the simulated cyberattack to preempt possible escalations of an ongoing actual cyberattack.

15. The method of claim 11, comprising:

configuring an autonomous response engine to cooperate with a cyber threat prediction engine and its Artificial Intelligence-based simulations to choose an initial set of one or more mitigation actions indicated as a preferred targeted initial response to a detected cyber threat by autonomously initiating those mitigation actions to defend against the detected cyber threat, rather than a human taking an action, where the autonomous response engine, rather than the human taking the action, is configured to autonomously cause the one or more mitigation actions to be taken to contain the cyber threat when a threat risk parameter from an assessment module in the detection engine is equal to or above an actionable threshold.

16. The method of claim 11, comprising:

configuring a cyber threat prediction engine and its Artificial Intelligence-based simulations to cooperate with the cyber-security restoration engine to assist in choosing one or more remediation actions to perform on nodes affected by the cyberattack back to the trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to their trusted operational state.

17. The method of claim 11, comprising:

configuring the separate multiple Artificial Intelligence-based engines to each have an interface to communicate with the other separate Artificial Intelligence-based engines that are configured to understand a type of information and communication that the other separate Artificial Intelligence-based engine needs to make determinations on an ongoing cyberattack from that other Artificial Intelligence-based engine's perspective, where each Artificial Intelligence-based engine has a messaging system to communicate with a human cyber-security team to keep the human cyber-security team informed on actions autonomously taken and actions needing human approval.

18. The method of claim 11, comprising:

configuring one or more Artificial Intelligence models in a detection engine to maintain what is considered to be normal behavior for each node in the system, which is constructed on a per node basis, on the system being protected from historical data of that specific node over an operation of the system being protected.

19. The method of claim 18, comprising:

configuring a cyber threat prediction engine and its Artificial Intelligence-based simulations to simulate how the cyberattack by the cyber threat could possibly have happened, and how the cyberattack might likely progress in a future tailored with an innate understanding of a normal behavior of the nodes in the system being protected and a current operational state of each node in the graph of the protected system during simulations of cyberattacks.

20. A non-transitory computer readable medium in an apparatus, comprising: one or more computer readable codes operable stored in an executable state, when executed by one or more processors, to instruct a cyber security system to perform the method of claim 11.

* * * * *